United States Patent

Holst et al.

[11] Patent Number: 5,914,091
[45] Date of Patent: *Jun. 22, 1999

[54] POINT-OF-USE CATALYTIC OXIDATION APPARATUS AND METHOD FOR TREATMENT OF VOC-CONTAINING GAS STREAMS

[75] Inventors: Mark R. Holst, Concord, Calif.; W. Karl Olander, Tampa, Fla.; Glenn M. Tom, New Milford, Conn.

[73] Assignee: ATMI Ecosys Corp., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/602,134

[22] Filed: Feb. 15, 1996

[51] Int. Cl.$^6$ .................................. F01N 3/10; B01J 8/00
[52] U.S. Cl. ........................ 422/173; 422/171; 422/177; 422/190; 422/198; 422/200; 422/201; 422/211
[58] Field of Search ..................................... 422/168–173, 422/177, 198, 178, 200–201, 190, 211, 189; 423/245.3, 210; 431/5, 7, 170; 110/235

[56] References Cited

U.S. PATENT DOCUMENTS

| | | | |
|---|---|---|---|
| 3,898,040 | 8/1975 | Tabak | 422/171 |
| 4,412,523 | 11/1983 | Schreiber et al. | 431/328 |
| 4,481,154 | 11/1984 | Gough et al. | 261/94 |
| 4,983,364 | 1/1991 | Buck et al. | 422/173 |
| 5,211,552 | 5/1993 | Krill et al. | 431/7 |
| 5,308,457 | 5/1994 | Dalla Betta et al. | 204/131 |
| 5,326,631 | 7/1994 | Carswell et al. | 428/256 |
| 5,364,259 | 11/1994 | Matros et al. | 431/5 |
| 5,410,989 | 5/1995 | Kendall et al. | 122/367.1 |
| 5,439,372 | 8/1995 | Duret et al. | 431/7 |

OTHER PUBLICATIONS

Munters Zeol Botor Concentrator VOC Abatement System, Dec. 2, 1993.
Durr Industries, Inc., Bay Area VOC and Air Toxic Emissions Environmental Seminar, Apr. 6, 1993.

Primary Examiner—Hien Tran
Attorney, Agent, or Firm—Steven J. Hultquist; Oliver A. M. Zitzmann

[57] ABSTRACT

A point-of-use catalytic oxidation system, for treatment of a VOC-containing gas stream, including: a heat exchanger for heat exchange of a VOC-containing gas stream and a VOC-reduced gas stream at higher temperature than the VOC-containing gas stream, for heat recovery from the VOC-reduced gas stream for cooling thereof, to preheat the VOC-containing gas stream; a supplemental heater for supplemental heating of preheated VOC-containing gas, if and as required, to an elevated temperature for catalytic oxidation of VOC therein; and a bed of catalytic oxidizer material for catalytic oxidation of VOC in the VOC-containing gas stream, to yield the VOC-reduced gas stream. The heat exchanger, supplemental heater, and bed of catalytic oxidizer material are sized, constructed, arranged, and operated to effect autothermal catalytic oxidation of VOC in the bed of catalytic oxidizer material. The system may further employ a smoother to attenuate influent VOC spikes in the feed gas, and/or a concentrator to concentrate the feed gas VOC species for high efficiency VOC removal in the catalytic oxidation.

29 Claims, 5 Drawing Sheets

POINT-OF-USE CATALYTIC OXIDATION APPARATUS AND METHOD FOR TREATMENT OF VOC-CONTAINING GAS STREAMS

BACKGROUND OF THE INVENTION

1. Field of the Invention

The present invention relates to an apparatus and method for the treatment of gas streams containing volatile organic compounds (VOCs) involving catalytic oxidation of the VOCs, in a point-of-use (POU) system, suitable for applications such as fabrication of semiconductor materials and devices, as well as products such as flat panel displays or other microelectronics products, manufacturing of compact discs (CDs) and other storage and memory devices, and photolithography applications involving oligonucleotide characterization.

2. Description of the Related Art

In the field of treatment of gaseous effluents in the manufacturing of semiconductor materials, devices, and products, storage and memory articles, and the use of photolithography for oligonucleotide characterization, a wide variety of effluent gases are produced in the process facility.

A large number of these effluent gases contain VOCs, such as alkanols, organics, photoresists, and breakdown products of photoresists and other reagents, and a wide variety of other gases which are desirably removed from the waste gas streams produced in the process facility, before the waste gas is vented from the process facility to the atmosphere.

The normal options for the treatment of VOC-containing gas streams include combustion and catalytic oxidation, which in either case may further include preliminary concentration of the gas stream VOC components to be removed by the treatment process.

Combustion processes are old and well-established in the art for the treatment of VOC-containing waste gas streams, however, catalytic oxidation processes are in increasingly widespread use as a result of their high efficiency and cost-effectiveness. By catalytically converting the VOCs oxidatively to the combustion products carbon dioxide and water, the catalytic oxidation process affords an effective solution to the problem of VOC-containing waste stream treatment.

One problem facing catalytic oxidation technology in applications such as those described hereinabove is the wide fluctuation in the composition of the waste gas stream, as various unit operations are carried out in the process plant. For example, in semiconductor manufacturing operations, the manufacturing facility may include workstations comprising tools for sequential unit operations on wafers or other substrate structures. The workstation may carry out a given sequence of operations using specific solvents, reagents, etchants, dopants, masks, photoresists, etc. in the various constituent steps of the manufacturing process.

As a result, the composition of the waste gases generated at a given workstation may vary widely over time, as the successive process steps are carried out, and the effluents generated in the workstations in the manufacturing facility may vary widely at any given time, among the various workstations and constituent sectors of the manufacturing facility.

Faced with this variation of the composition of the waste gas streams from the process facility, and the need to adequately treat the waste gas on a continuous and ongoing basis during the operation of the facility, it has been a common approach to provide a single, overdesigned (in terms of treatment capacity), large-scale waste gas treatment system for an entire process facility, which can continuously treat the waste gas in the form of a combined stream yielded by consolidation of all the individual workstation waste gas streams in the facility. Such large-scale catalytic oxidation units, receiving all the waste gas from the entire process facility, typically are disposed in proximity to final venting means such as vent gas stacks, for efflux of the final treated VOC-depleted effluent to the atmosphere. Roof-mounted catalytic oxidation systems are commonly employed for such purpose.

By such large-scale treatment of a single consolidated gas stream deriving from the entire process facility, the oscillations and peaks of specific components of waste gas species generated in the facility are to some extent damped. In consequence, the loading of VOC from particular waste gas species on the oxidation catalyst in the treatment system is maintained at a lower peak value, due to dilution or spreading effects.

Considering the thermal and thermodynamic aspects of operating such single unit, large-scale VOC treatment systems, the waste gas stream from the process plant in order to carry out efficient catalytic oxidation of the VOC content of the waste gas stream, must be heated to an appropriate elevated temperature for catalytic oxidation. Additionally, the catalytic oxidation process is strongly exothermic in character, so that substantial heat is generated in the operation of the catalytic oxidation process. Accordingly, economic operation of the catalytic oxidation process requires that a substantial portion of the heat generated by the catalytic oxidation be recovered and re-used within the process, to bring the influent gas stream to an appropriate level for catalytic oxidation of the VOC therein while concurrently reducing the temperature of the effluent from the catalytic oxidation process to an appropriate level for ultimate discharge of the finally treated gas to the atmosphere.

The efficient operation of the catalytic oxidation process system also requires the achievement and maintenance of appropriate operating temperature in the bed of oxidation catalyst during catalytic oxidation of the VOC-containing gas.

As a result of the highly exothermic character catalytic oxidation, oxidation catalyst must be provided in sufficient quantity to thermally accommodate the overall heat balance in the process system, irrespective of fluctuations in the composition of the effluent gas stream being treated. Further, dilution air addition to process streams in the plant facility significantly increases the volume and volumetric flow rate of the effluent which is treated to remove VOCs therefrom. Such dilution air may derive from air added to the VOC-containing effluent upstream of the catalytic oxidation unit to provide control the temperature in the exothermic oxidation reaction, and prevent thermal "runaway" conditions from occurring. The dilution air content of the effluent gas stream may also derive from introduction of air as a carrier or "sweep" gas in specific processing operations in the plant facility, by which VOCs and other components are entrained in the air stream for subsequent effluent treatment. Accordingly, the catalytic oxidation beds in large scale, single unit catalytic oxidation systems are typically greatly oversized, relative to the size and scale of oxidation catalyst beds which would otherwise be minimally required for treatment of an effluent stream from the process plant as a whole, at average operating conditions, average concentration levels, average composition of VOCs in the effluent gas stream, and without large surplusage of dilution air in the effluent gas being treated.

If such large scale, single unit catalytic oxidation system is not oversized, then any substantial fluctuation increases in the amount of catalytically oxidizable matter in the waste gas stream may result in undesirable overheating in the catalytic oxidation bed in the treatment system, as well as the potential development of thermal runaway conditions.

With the provision of large-size overdesigned beds of oxidation catalyst to accommodate wide variations in the concentration and types of VOC loadings in the effluent gas stream, it is necessary to concurrently provide make-up heat in the catalytic oxidation system upstream of the catalytic oxidation bed, so that the temperature of the gas stream being introduced to the oxidation catalyst is at a desired elevated temperature level even when the gas stream has a relatively low concentration of VOCs. Consequently, it is conventional practice to continually add in natural gas, propane, or other fuel to the effluent gas stream, and to provide supplemental heating, to maintain set point operating conditions as nearly as possible in the catalytic oxidation operation. In various catalytic oxidation systems, it is also common to add diluent gases to the effluent gas stream, to control temperature in the catalytic oxidation process. In the operation of conventional catalytic oxidation systems, it is desired to recover sufficient heat from the catalytically oxidized gas stream discharged from the catalytic oxidation bed, so as to achieve superior process efficiency, minimize the amount of added heat, and maintain a good overall thermal energy balance in the process system.

Due to the size and overdesigned character of the catalytic oxidation systems of the prior art, as required to treat cyclical loads of various VOC species, the efficiency of such systems in normal day-to-day operation is quite low. Further, when such effluent treatment systems encounter a gas stream component which poisons the oxidation catalyst, e.g., hexamethyidisilazane, the process plant's effluent treatment system is compromised, and the replacement of the extremely large inventory of catalyst is time-consuming, costly, and labor-intensive. Such disadvantages also inhere in the normal change-out of oxidation catalyst, since if an entire process facility is dependent on a single catalytic oxidation system for effluent treatment, the shut-down of the catalytic oxidation system for any reason means that the entire process facility must be taken off-line, or else the waste gases requiring treatment must be stored until the effluent gas treatment capability is restored.

In sum, the typical unitary VOC abatement systems for treatment of consolidated VOC-containing streams for an entire process facility are large units which treat relatively low ppmv concentrations of organic pollutants. These systems treat large volumes of air (30,000 cfm and more). As a result, they are expensive to purchase, expensive to install and costly to operate. Such unitary large-scale systems typically use flame oxidation to convert the VOC to $CO_2$ and water, which can often lead to undesirable by-products such as $NO_x$.

In addition, there exist a number of industries, e.g., the semiconductor industry, in which gas streams are treated to remove VOC components which originate from specific "point sources," i.e., single tools, individual processing operations, etc., within the plant facility, and by addition of such point source effluent gases to other flows of gases in the facility, a combined or consolidated effluent stream is yielded which then is subjected to final treatment for VOC removal. Thus, when a VOC fume is traced back to the originating point source, it may be found that significant quantities of dilution gases and other, e.g., non-VOC-containing, fume streams have been added to the original point source VOC-containing gas, to constitute an overall effluent gas flow stream for treatment.

In the semiconductor industry, VOC fumes may derive from photolithography tracks, isopropyl alcohol (IPA) dryers, organic spray resist strip tools, wet bench-based resist strip tools, spin-on-glass (SOG) tracks, various coaters, and parts cleaning wet benches of the semiconductor manufacturing facility ("fab"). Typically, these tools are batch process tools, and they may be chambered in order to allow sequential processing of wafers through the tool.

It is also typically found that only a relatively small number of the chambers of each tool actually contain VOCs. The net result is that a large end-of-line flow contaminated with trace quantities of VOC may be traceable back to a few point sources of VOCs which generate a high fraction (e.g., 97%+) of the VOCs being emitted from the fab. Significantly, these point sources can be readily determined and predicted through knowledge of the physical operation of the tool and through emissions characterization (using gas chromatograph, flame ionization detector (FID), etc.) of the gas flows coming from the tool.

Most importantly, these point source emissions are contained within low flow rates of air which are substantially less than the total flow rate of effluent (fumes and air) being emitted at the end of the effluent gas flow line. The total end-of-line gas flow thus may comprise a combined gas stream, whose constituent gas components derive from sources such as (i) the admission of dilution air (such as cabinet sweep air) into solvent duct headers in the process facility, (ii) fumes produced in processing equipment in which reagents, reactants, products, and/or other chemical components have very low vapor pressures, (iii) fumes produced by tools which are rarely operated, and (iv) fumes produced by tools with which solvents have been used that are no longer classified as ozone precursors by governing laws and/or regulations, and thus may be treated in combination with other gas species.

By treating the emissions directly from the aforementioned point sources in a point-of-use (POU) fashion, as hereinafter more fully described, the majority of the mass of VOCs being emitted from the processing facility can be destroyed, but with the processing of only a small fraction of the flow which otherwise would require treatment if the entire end-of-line flow from the processing facility were treated. The total VOC abatement fume flow processed by utilizing a POU approach versus an end-of-line approach may be as great as 10 to 1, or even greater.

It would therefore be a significant advance in the art, and accordingly is an object of the present invention, to provide an apparatus and method for the catalytic oxidation treatment of gas streams containing VOCs, in a point-of-use system which is constructed and arranged to treat only the effluent from a single workstation unit or tool in the process facility, so that the system is readily and simply adjustable to accommodate the specific waste gas effluent from a given workstation, tool, unit operation, or sequence of operations, within the process facility.

Such a point-of-use system would have the following advantages relative to large scale, single unit catalytic oxidation systems of the prior art: (1) the volume of the effluent gas stream being treated would be substantially reduced; (2)

the oxidation catalyst required would be relatively small in volume and could be readily, simply, and economically replaced, without shut-down of the entire plant's effluent treatment system; (3) the process conditions for effluent gas treatment could be more simply, reliably and economically controlled, to achieve high efficiency effluent gas treatment, (4) the effluent gas treatment system could be more efficiently designed, and significantly more compact; (5) diluent gas requirements for temperature control of the catalytic oxidation operation could be significantly reduced; (6) since a point-of-use catalytic oxidation system would be significantly smaller in size and more efficiently designed and operated, such system would be significantly more cost-effective than a large-scale system for an entire process plant; and (7) such cost-efficiency of the point-of-use system would favor flexibility in expansion and modification of the process plant, since otherwise the large-scale catalytic oxidation system for an entire process plant must be overdesigned not only operationally to accommodate gross fluctuations in the composition, temperature and flow rate of the stream being treated, but it also must be overdesigned if it is to accommodate future expansion of the process plant, without wholesale revamping of the effluent treatment system (by contrast, process plant expansion with point-of-use systems would merely entail addition of discrete point-of-use gas treatment modules).

It would therefore be a significant advance in the art, and is an object of the present invention, to provide a catalytic oxidation system that is of a point-of-use character.

It is another object of the present invention to provide such a point-of-use catalytic oxidation system that is autothermal in character.

As used herein, "autothermal catalytic oxidation" means catalytic oxidation of a VOC-containing effluent gas stream, yielding a hot treated gas stream of reduced VOC content from which heat is recovered and used for heating the VOC-containing effluent gas stream to an appropriate elevated temperature for catalytic oxidation, without the addition of externally supplied heat. In other words, under autothermal catalytic oxidation conditions, no heating of the VOC-containing effluent gas stream is required beyond the heating of such gas stream with the heat recovered from the catalytically oxidized gas stream.

Autothermal catalytic oxidation of VOC-containing gas streams has not been successfully practiced in the prior art because the large scale, single unit catalytic oxidation systems of the prior art must be operated well below the autothermal threshold. Specifically, sub-autothermal operation is required to avoid generation of excess heat and the risk of thermal runaway under widely fluctuating VOC concentration and loading conditions. Accordingly, significant supplemental heating of the influent VOC-containing gas stream is necessary to maintain the catalytic oxidation bed at a sufficiently high temperature for efficient operation.

One of the principal difficulties in achieving practical autothermal operation is due to batch-wise variability in concentration of some fume streams. In some industries, such as the semiconductor industry, the VOC emitting tools may be operated to carry out a number of steps in a sequence; thus, in the fabrication of semiconductor devices, a wafer passing through a tool may be subjected to a multiplicity of process steps. These steps occur as a single wafer is processed in a chamber of the particular processing tool. By way of example, for a wafer undergoing coating with a photoresist, these steps may comprise: a) receipt of a new wafer on a coater bowl spin chuck, b) spinning of the wafer on the spin chuck, c) application of photoresist on the spinning wafer from a dispense arm, d) spinning excess photoresist off of the wafer, e) application of edge bead remover (top side and bottom side) to the wafer edge using a dispense arm, f) spinning off of the edge bead remover, g) application of a coater bowl rinse to clean residual photoresist and edge bead remover from the spinning wafer containment cup, and h) termination of spinning and removal of the wafer.

Because chemicals such as photoresist and edge bead remover typically have very high concentrations of volatile chemical solvents used as a carrier and coating uniformity enhancer for the non-volatile coater materials, pigments and photo-active ingredients which are desired to be coated on the wafer, simple vapor-liquid equilibria with the uniform air sweep passing over the wafer dictate that the evaporating solvent concentration will vary widely and in a transient fashion as the wafer is processed through each of the aforementioned steps.

During steps a) and b), very little solvent vapors will be emitted. During steps c) and d), very high levels of solvent will be emitted, as the material is applied and spun off. During steps e) and g), high levels of solvent will be emitted, but they will tend to be different chemicals than those emitted in steps c) and d). During step g), a high level of solvent of a different chemical may be emitted. During step h) emissions will be low since most of the solvent will have already evaporated.

In other segments of process facilities, different batchwise tools may be utilized. For example, in the specific case of an IPA dryer, the equipment system may consist of a bath of boiling IPA, above which is located a set of condensing coils, with a lid over the bath to prevent IPA vapor escape, a tray within which to load wafers to be dried, and an exhaust system to draw a constant flow of sweep air through the lid of the IPA dryer and over the top of the IPA bath, typically above the level of the condensing coils.

In such system, a typical wafer processing sequence may comprise: a) loading wafers into the tray with the lid closed, b) opening the lid, c) lowering the wafers past the condensing coils and into the IPA vapor area directly over the boiling IPA bath but below the level of the condensing coils, d) allowing the wafers to dry while in that IPA vapor region, e) retracting the tray of dried wafers up out of the IPA vapor zone and past the condensing coils, g) aspirating any liquid IPA which may have accumulated in the tray, h) opening the lid on the dryer, and l) fully retracting the tray of now-dried wafers to their original position.

Testing of process gas effluents has shown very wide fluctuations in concentration of the emissions coming from IPA dryers due to wide ranges of vapor-liquid equilibria conditions for each step of the above-described sequence. In one case it was found that emissions when IPA was aspirated from the tray were almost 5 to 10 times greater than the average concentration emitted during the overall wafer drying process cycle.

It is also important to note that such concentration variability within the process sequence cycle of each tool in the process facility is also exacerbated by a concentration variability between the various tool types which may be located at such facility. To choose a semiconductor fab as an typical example, emissions will be very different among IPA dryers, photolithography tracks, spin-on-glass coaters, organic spray resist strip tools, organic strip wet benches, and parts cleaning benches.

In addition, the chemistries may vary from track to track. In some applications, such as semiconductor fabs, chemistries may change widely and frequently, due to the constant influx of new mixtures offering advantages in processing capability and overall wafer processing reliability and lack of defects.

For example, one track may be processing a photoresist A with edge bead remover (EBR) 1 while a second track is processing an anti-reflective coating (ARC) B and an ARC EBR 2. The chemistries may be totally different and the emissions characteristics, which are dictated by the vapor-liquid equilibrium characteristics of the chemistries employed, may also vary considerably.

This process variability is further exacerbated by the fact that emissions may vary greatly from one manufacturer's tool to another manufacturer's tool. This may be due for example to subtle variations in interactions between air sweep rates over surfaces being coated and the chemicals being applied to the surface, air flow patterns over the surface of the wafer, different chemical application and dispense means and durations, different application and spin cycle times, different spin rates, etc.

The net effect of such variability is that it is very difficult to apply a single point-of-use VOC abatement technology to cover all the point sources within a semiconductor fab environment, or other processing complex, even though the advantages of pursuing a point-of-use approach are overwhelmingly great as compared to pursuing an end-of-line approach.

Because of the variety of tools in each facility and the wide variety of chemistries used in each tool, point-of-use VOC abatement equipment has not come into common usage, and instead VOC treatment has been carried out on bulk, dilute gas streams combined from constituent flows of VOC-containing gases from the entire plant facility, or with highly customized VOC treatment systems which by virtue of their customized character are of limited use in treating other gas streams or being shifted to other tools in a flexible manufacturing environment.

Highly customized VOC abatement systems are expensive, and do not enjoy the economics and ready availabilities/short lead times of mass production abatement systems. If a multiplicity of such customized VOC abatement systems are utilized, with each unit being deployed for point-of-use treatment of one of the numerous gas streams generated in the manufacturing or process facility, the attendant capital and operating costs of such customized approach can destroy the economic advantages which are conceptually afforded by point-of-use gas stream treatment.

Another factor which negatively impacts the economics of point-of-use VOC abatement is the effect of widely varying VOC concentration and its impact on the thermal management of the catalytic oxidation process. Because of high peak loads of VOC which typically are present in the operation of semiconductor fabs and other facilities generating VOC-containing gases, it generally is necessary to design the VOC treatment system equipment to accommodate the peak load (maximum VOC) condition. This is due to the fact that designing the system for a lower VOC load specification will result in over-temperature conditions developing in the system during VOC concentration excursions to high load levels.

Such over-temperature effects become especially significant when catalytic oxidation technology is employed, which requires that a minimum "light-off" temperature be maintained at the inlet to the catalyst. The net result is that such sudden and increasing VOC concentration excursions will generate a "pile-up" of enthalpy (translated to heat energy which is sensed as temperature) on the baseline light-off temperature.

Such sudden enthalpic increases and resulting over-temperature conditions make it particularly difficult to manage large-scale concentration excursions in a point-of-use system without designing to the maximum concentration and VOC load expected.

While such "maximum excursion" design practice is highly prudent to mitigate and minimize the effects of the over-temperature conditions developing during concentration excursions, it poses a significant dilemma for the designer in maintaining operating costs within economic limits. This is due to the fact that in "maximum excursion" design, the VOC oxidation system is based (sized, constructed, and operated) on the assumption that the VOC oxidation system can only be autothermal during maximum VOC concentration conditions.

During the remainder of the operating cycle, the VOC concentration will, by definition, be inadequate to support an autothermal condition. The net result will be that supplemental energy, in the form of electric heat or burner heat, will be required to make up for the enthalpy deficit present in the VOC catalytic oxidation unit during those periods of below-maximum VOC concentration. This sub-autothermal operation thus results in higher operating costs for the system, in terms of energy requirements for continuous operation.

In some environments, the utilities which are available for a point-of-use system may be more costly on a per unit basis than utilities which are available for an end-of-line system. This is because a point-of-use system is designed to be located in close physical proximity to the tool set, which may in turn be located in extremely clean, classified, or restrictive environments, e.g., within a semiconductor fab.

The end-of-line system typically is so massive that it could not possibly be located within these restricted environments, and therefore it is located outside where, advantageously, inexpensive utilities may be readily available for the system, without violation of building codes.

By way of example, the utility costs of electricity and hydrogen, commonly the only fuels available in a semiconductor fab, are on the order of $0.05 to $0.10 per kW-hr, and $82/MM BTU, respectively, while natural gas, which is readily available outside the semiconductor fab, may have a utility cost of $5 to $3/MM BTU.

The application of "maximum excursion" design, in which the VOC catalytic oxidation system is sized based on the highest possible effluent stream concentration of VOCs, to end-of-line VOC abatement systems has no significant detrimental impact on the economics of the end-of-line system, because it already is grossly overdesigned.

On the other hand, the application of such "maximum excursion" design principles has a tremendous impact on a point-of-use system and can wholly eliminate the overwhelming economic advantage otherwise offered in the deployment of point-of-use systems by virtue of their processing of greatly reduced volumetric gas flow rates (relative to end-of-line systems).

Accordingly, in a point-of-use system, it is of great advantage to operate the VOC oxidation system at a VOC inlet concentration which is closer to a time-averaged level for the stream than is even remotely approachable in end-of-line VOC abatement systems.

Relative to the apparatus and method of the present invention as hereinafter more fully disclosed, relevant art in the field of the invention includes the following: U.S. Pat. No. 5,326,631 to Carswell et al. (metal fiber/ceramic porous fiber burner); U.S. Pat. No. 5,439,372 to Duret et al. (surface combustion radiant burner with blue flame combustion zones surrounded by surface radiant combustion zones); U.S. Pat. No. 5,410,989 to Kendall et al. (watertube boiler system employing fiber matrix radiant burners which radiantly heat tube coils containing water); U.S. Pat. No. 5,211,552 to Krill et al. (flameless combustion of gaseous fuel with air in an amount of 50% to 150% in excess of the stoichiometric requirement, with the fuel/air mixtures being passed through a porous surface combustor to an adiabatic zone); U.S. Pat. No. 4,412,523 to Schreiber et al. (gas-fired, forced air furnace system including a heat exchanger in the air stream and a combustion chamber containing a fiber matrix element, and means for igniting gas-air mixtures to produce radiant heating and convection heating, with heat exchanger surface area preselected corresponding to excess air and heat input, to condense moisture in combustion gases, for achievement of at least ninety percent thermal system efficiency); and U.S. Pat. No. 4,481,154 to Gough et al. (multi-loop tube inserts for enhancing heat exchange efficiency).

Because of the wide variations in VOC loading from the different tools in the normal operation of the process plant in which VOCs are generated as waste gas components, as well as the wide variations within even tools of similar type depending on the manufacturer and chemistries used, and the inevitability of frequent changes in manufacturing chemistry in process facilities such as semiconductor fabs, as necessary to keep up with changing technology, it becomes extremely difficult to design a single "multiple-off" mass produceable system which will accommodate all tool emissions in an economic package.

The alternative is to introduce a high level of custom engineering to each unit, which places a tremendous cost burden on a fab which purchases a multiplicity of point-of-use VOC abatement units for incorporation with the various tools within the fab. This custom engineering cost disadvantage is exacerbated by the fact that point-of-use VOC abatement systems must be deployed as a constellation of numerous units scattered throughout the plant facility, rather than a single unit for such entire facility.

Such point-of-use VOC system cost disadvantage is further exacerbated by the frequently changing chemistries and tool sets within the fab environment. A unit which was designed for an autothermal condition on one tool with a given chemistry set, may be totally inadequate because the chemistries used in that tool changed, or because the tool was replaced with a different tool or put into a different service. These practices are very common in industries such as the semiconductor industry, and can necessitate substantial heavy retrofitting and high rework costs in order to maintain satisfactorily high VOC abatement efficiency of the system. If this retrofitting and rework is not performed, the catalytic oxidation VOC abatement system will either constantly "overthermalize" (experience over-temperature conditions) or with constant utility draw substantially deviate from optimal "autothermal" catalytic oxidation conditions.

In consequence of the aforementioned problems, the provision of a flexible point-of-use catalytic oxidation VOC abatement system, which can handle a wide variety of VOC duties very efficiently, and which possesses a design eliminating or substantially minimizing the necessity of custom engineering, would be a fundamental advance in the art of VOC abatement, and of utmost importance to the evolution and further progress of industries such as semiconductor manufacturing. Such a system would possess the ability to flexibly operate in a thermally efficient manner with widely varying tool sets, VOC concentrations, VOC-containing gas stream flow rates, and chemistries.

It is a further object of the invention to provide a flexible point-of-use catalytic oxidation VOC abatement system of such character.

It is yet another object of the invention to provide a point-of-use catalytic combustion system for the treatment of VOC-containing gases of varying type, wherein the system is embodied in an apparatus of a highly compact character, to accommodate the placement thereof in close physical proximity to the process equipment which is the source of the VOC-containing gas to be treated.

In one of the applications of VOC abatement systems, the product is supplied to the semiconductor industry on photolithography tracks. The process units which are employed, are designed to prepare a silicon wafer to receive a photomask coat, apply a thin photosensitive photomask to the silicon wafer, bake the mask which has been applied to the wafer, shuttle that wafer to a stepper which applies a pattern to the wafer through a masking and exposing process, receive the wafer back, wash the wafer with a developing solution which removes exposed photomask and leaves behind unexposed photomask (in the case of positive photoresists), or alternatively removes unexposed photomask and leaves behind exposed photomask (in the case of negative resist).

In some cases, special materials must be applied to prepare the silicon wafer surface for receiving the application of the photomask coating. In the case of silicon wafers, this surface priming material is typically hexamethyldisilazane (HMDS). The purpose of this priming material is to allow the photomask to be applied to the wafer and promote good adhesion. In this case, it is logical that this priming material be an organosilicate such as HMDS, since the objective is to promote the adhesion of an organic photomask to a silicon-based silicon wafer.

In some cases, materials other than HMDS may be used for priming the surface, but these also tend to be organosilicates of different forms and character, due to the fundamental requirement to bond an organic photomask to an inorganic substrate.

Such use of HMDS, when it occurs, has certain negative implications for VOC abatement practices which must be used to abate the fumes deriving from the associated process equipment. In the case of catalytic oxidation of VOCs, the HMDS will tend to mask the active surfaces of the oxidation catalyst and cause an eventual loss of performance. In the case of thermal oxidation, the HMDS may oxidize to form $SiO_2$ particulates, which then act deleteriously to occlude heat exchangers and ducting.

Accordingly, it is a further object of the present invention to provide a VOC abatement system, in which HMDS is selectively removed and prevented from deactivating the oxidation catalyst and/or forming occlusive particulates which can damage the process system or lower its performance to unsatisfactory levels.

Additional objects and aspects of the present invention will be more fully apparent from the ensuing disclosure and appended claims.

SUMMARY OF THE INVENTION

The present invention relates to a point-of-use VOC oxidation system, which may variously be constructed and arranged for catalytic and/or thermal oxidation of the VOC content of a VOC-containing gas stream. The point-of-use VOC oxidizer may comprise a catalytic oxidizer and/or a thermal oxidizer, and either type of POU VOC oxidizer may be optionally provided with means or capability of removing hexamethyldisilazane when present in the gas stream to be treated.

In one broad aspect, the invention relates to an autothermal catalytic oxidation apparatus and method for the treatment of gas streams containing volatile organic compounds (VOCs).

In one apparatus aspect, the present invention relates to a point-of-use catalytic oxidation apparatus, for treatment of a VOC-containing gas stream, comprising:

- a heat exchanger defining a first gas flow path for the VOC-containing gas stream and a second gas flow path for a VOC-reduced gas stream at higher temperature than the VOC-containing gas stream, wherein the first gas flow path and the second gas flow path are in heat exchange relationship with one another, to effect heat recovery from the VOC-reduced gas stream for cooling thereof, and to preheat the VOC-containing gas stream;
- means for introducing the VOC-containing gas stream to the heat exchanger and for discharging the cooled VOC-reduced gas stream from the heat exchanger;
- a supplemental heater for supplemental heating of preheated VOC-containing gas, if and as required, to an elevated temperature for catalytic oxidation of VOC therein;
- means for passing the preheated VOC-containing gas stream from the heat exchanger to the supplemental heater;
- a bed of catalytic oxidizer material for catalytic oxidation of VOC in the VOC-containing gas stream to yield the VOC-reduced gas stream;
- means for passing the VOC-containing gas from the supplemental heater to the bed of catalytic oxidizer material for catalytic oxidation of VOC therein to yield the VOC-reduced gas stream;
- means for passing the VOC-reduced gas stream from the bed of catalytic oxidizer material to the heat exchanger for flow through the second gas flow path thereof; and
- means for discharging a cooled VOC-reduced gas stream from the second gas flow path of the heat exchanger;
- wherein the heat exchanger, supplemental heater, and bed of catalytic oxidizer material are sized, constructed and arranged to effect autothermal catalytic oxidation of VOC in the bed of catalytic oxidizer material, preferably with the heat exchange conducted in the heat exchanger being selectively adjustable by heat exchange enhancement inserts which are deployed in heat exchange passage(s) of the heat exchanger in sufficient number and placement for the autothermal catalytic oxidation in the bed of catalytic oxidizer material.

In another aspect, the point-of-use catalytic oxidation apparatus as described above may further comprise a smoother bed of physical sorbent material having sorptive affinity for VOC, with an inlet for introducing VOC-containing gas to the smoother bed for sorption of VOC thereon, and outlet means, coupled to the means for introducing the VOC-containing gas to the heat exchanger, for discharge of VOC-containing gas from the smoother, so that the smoother bed damps variations in VOC content in the VOC-containing gas introduced thereto.

In a further aspect, the point-of-use catalytic oxidation apparatus as described above may further comprise a concentrator for receiving a VOC-containing feed gas stream and producing a VOC-containing gas stream of higher VOC content than the VOC-containing feed gas stream, such concentrator comprising a rotating bed of sorbent material which is partitioned to form sections of the rotating bed containing corresponding portions of said sorbent material, with a VOC-containing feed gas stream inlet arranged in flow relationship with a section of the rotating bed, for sorption of VOC from the feed gas stream on the portion of sorbent material in such section to yield a reduced VOC gas stream, a reduced VOC gas stream outlet arranged in flow relationship with such section of the rotating bed receiving the VOC-containing feed gas stream from the VOC-containing feed gas stream inlet, to discharge the reduced VOC gas stream from such section of the rotating bed, a desorption gas stream inlet arranged in flow relationship with another section of the rotating bed having VOC sorbed on the sorbent material therein, for desorption of VOC from the sorbent material in such other section of the rotating bed into a desorption gas stream flowed therethrough to form a VOC-containing gas stream, and a VOC-containing gas stream outlet arranged in flow relationship to (a) such other section of the rotating bed, for discharge of VOC-containing gas, and (b) the means for introducing the VOC-containing gas stream to said heat exchanger.

In the apparatus broadly described hereinabove, the heat exchanger, supplemental heater, and bed of catalytic oxidizer material are advantageously sized, constructed and arranged to recover at least 50% of the heat, e.g., 50% to 90%, and more preferably from 60% to 80%, from the VOC-reduced gas stream, in the preheated VOC-containing gas stream.

The heat exchanger of the apparatus broadly described hereinabove may comprise a shell-and-tube heat exchanger, wherein the heat exchanger first gas flow path for the VOC-containing gas stream comprises the tube-side gas flow passage and the second gas flow path for the VOC-reduced gas stream comprises the shell-side gas flow path. Such heat exchanger may be constructed and arranged to comprise a multiplicity of selectively removably installable gas flow stream-interrupting inserts which are removably positionable in the first gas flow path, so that the heat exchanger comprises at least one of the gas flow stream-interrupting inserts installed therein, to adjust the heat flux and heat recovery characteristics of the heat exchanger. The heat exchanger may for example provide from 25 to 500 square feet, preferably from 50 to 300 square feet, more preferably from 80 to 250 square feet, and most preferably from 100 to 200 square feet, of tube-side heat transfer area.

The oxidation catalyst may suitably comprise a catalytic metal composition such as platinum, palladium, platinum/rhenium, etc., on a support such as a crimped metal foil, monolithic support, or other suitable catalyst substrate.

In a preferred aspect of the point-of-use catalytic oxidation apparatus broadly described hereinabove, the heat exchanger, the means for introducing the VOC-containing gas stream to the heat exchanger and for discharging the cooled VOC-reduced gas stream from the heat exchanger, the supplemental heater, the means for passing the preheated VOC-containing gas stream from the heat exchanger to the supplemental heater, the bed of catalytic oxidizer material, the means for passing the VOC-containing gas from the supplemental heater to the bed of catalytic oxidizer material, the means for passing the VOC-reduced catalytic oxidation effluent stream from the bed of catalytic oxidizer material to the heat exchanger for flow through the second gas flow path thereof; and the means for discharging the cooled VOC-reduced gas stream from the second gas flow path of the heat exchanger, all reside in a unitary housing having a volume not exceeding 250 cubic feet, preferably not more than 100 cubic feet, and most preferably not exceeding 50 cubic feet, with the unitary housing having a correspondingly small footprint area, e.g., not exceeding 25 square feet, more preferably not exceeding 15 square feet, and most preferably not exceeding 10 square feet. By way of specific example, the unitary POU VOC treatment unit may be housed in a cabinet 28 inches×32 inches in footprint (floor-engaging cross sectional area), and 74 inches in height.

In another aspect, the invention relates to a process for treatment of a VOC-containing gas stream, to remove VOC therefrom, such process comprising:

providing a first gas flow path for the VOC-containing gas stream in heat exchange relationship with a second gas flow path for a VOC-reduced gas stream at higher temperature than said VOC-containing gas stream;

flowing the VOC-containing gas stream along the first gas flow path in heat exchange relationship with VOC-reduced gas flowed along the second gas flow path, to effect heat recovery from said VOC-reduced gas stream for cooling thereof, and to preheat the VOC-containing gas stream;

supplementally heating the preheated VOC-containing gas, if and as required, to an elevated temperature suitable for catalytic oxidation of VOC therein;

catalytically oxidizing VOC in the VOC-containing gas stream, to yield the aforementioned VOC-reduced gas stream;

flowing the VOC-reduced gas stream through the second gas flow path for cooling thereof; and discharging a cooled VOC-reduced gas stream from the second gas flow path;

wherein the heat exchange relationship, flows of the VOC-containing gas stream and VOC-reduced gas stream, supplemental heating, and catalytic oxidation are carried out so that the catalytic oxidation is autothermal in character.

In the above-described process, the VOC-containing gas stream prior to flow along the first gas flow path may be contacted with a smoother bed of physical sorbent material having sorptive affinity for VOC, and in flow communication with the first gas flow path, so that the smoother bed damps variations in VOC content in the VOC-containing gas introduced thereto.

The above-described process may further comprise concentrating VOC from a feed gas stream to produce the aforementioned VOC-containing gas stream, by the steps of contacting the feed gas stream with a sorbent material selective for VOC in the feed gas stream, to yield sorbed VOC on the sorbent material, and thereafter contacting the sorbent material with a desorbing fluid stream, to desorb the VOC sorbed from the sorbent material into the desorbing fluid stream, and thereby yield the VOC-containing gas stream.

The catalytic oxidation may be usefully carried out at a temperature in the range of from 150° C. to 450° C., and preferably in the range of from 200° C. to 375° C.

In a preferred aspect of the process as broadly described above, the heat exchange, supplemental heating, and catalytic oxidation are conducted as a point-of-use process, in a unitary housing or cabinet defining a VOC treating zone.

In another aspect of the invention, the effluent treatment system may provide capability for the removal of HMDS as well as of VOCs from effluent streams, particularly when the effluent derives from a photolithography track or a multiplicity of photolithography tracks in the process facility.

The apparatus and method aspects of the invention described hereinabove, relating to catalytic oxidation embodiments of the invention, may be varied by the deployment of thermal oxidation means and method, in place of the catalytic oxidation means and method illustratively disclosed.

Additional aspects, features, and embodiments of the invention will be more fully apparent from the ensuing disclosure and appended claims.

DETAILED DESCRIPTION OF THE INVENTION, AND PREFERRED EMBODIMENTS THEREOF

Figure 1:
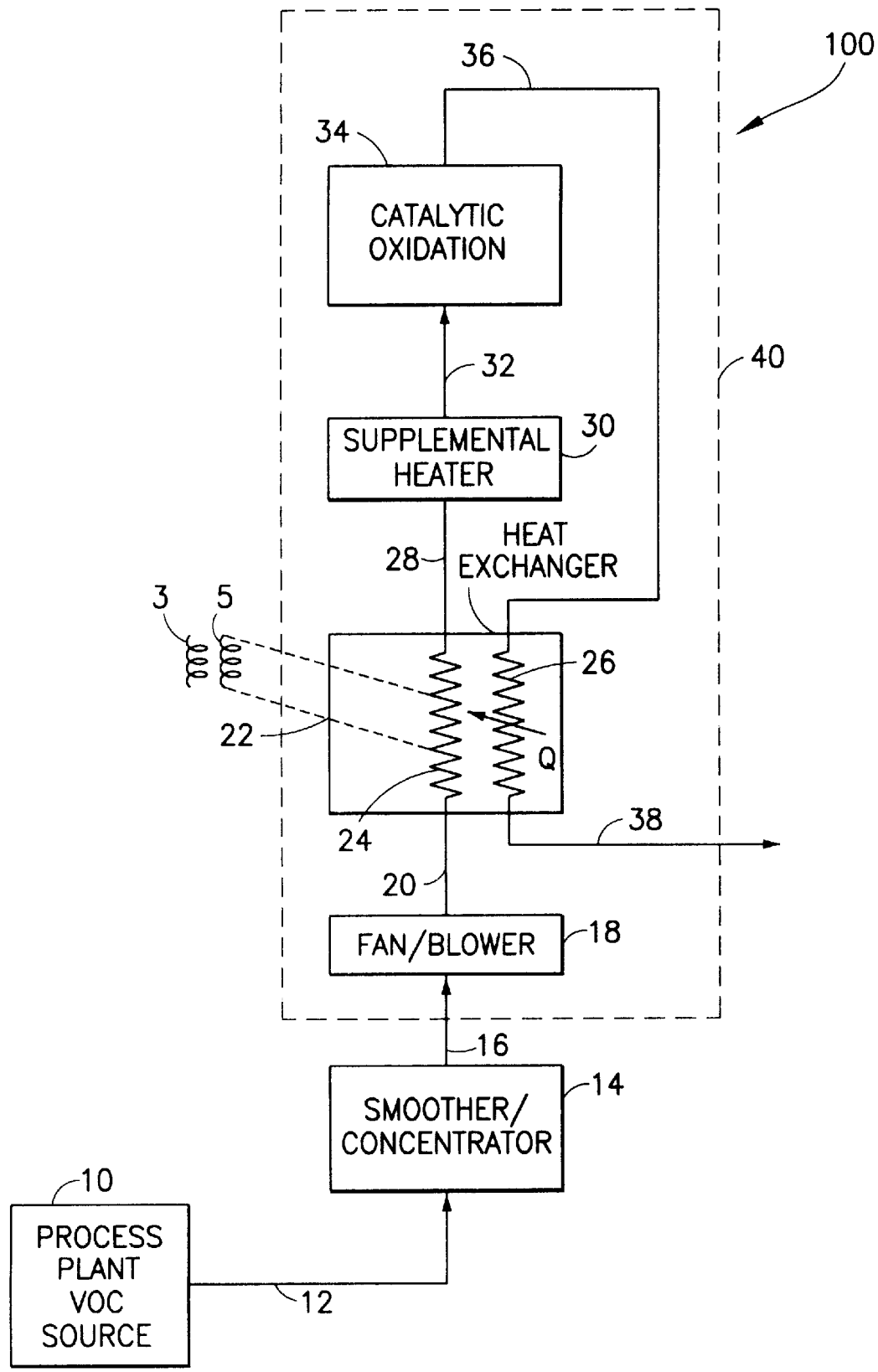
FIG. 1 is a schematic flowsheet representation of an oxidation system according to one embodiment of the invention.

The present invention is based in one aspect on the discovery of a point-of-use catalytic or thermal oxidation system with a selectively adjustable heat transfer efficiency character, which as a result possesses the capacity to operate at desired set point operating conditions, e.g., autothermally in the case of catalytic oxidation treatment of the VOC-containing gas stream.

Such capacity, to operate autothermally in a catalytic oxidation system or otherwise in a highly efficient manner in a thermal oxidizing system, is usefully provided in the broad practice of the invention by an oxidation system including a heat exchanger which can be selectively adjusted to provide a greater or lesser heat transfer coefficient and heat flux for the recovery of heat from the oxidized gas stream. In the heat exchanger, the oxidized gas stream is in heat exchange relationship with the influent VOC-containing gas stream being flowed through the heat exchanger, to effect preheating of the influent VOC-containing gas stream to an appropriate temperature for the subsequent oxidation operation.

Although principally described hereinafter in reference to catalytic oxidation systems for the treatment of VOC-containing gas streams, it will be recognized that the utility of the present invention is not thus limited, but rather extends to and includes thermal oxidation systems, within its broad scope. Accordingly, in respect of the catalytic oxidation module or chamber illustratively referenced in the ensuing embodiment descriptions herein, it is to be appreciated that the oxidation catalyst chamber or module could be replaced by a thermal oxidation unit, which additionally could be consolidated with the supplemental heater utilized in certain catalytic oxidation embodiments shown and/or described herein.

With decreasing size of the catalytic oxidation system, and smaller oxidation catalyst beds and heat exchangers, as required in a point-of-use system, close process control and optimal operation of the VOC-containing gas treatment system become progressively more important. In the large-scale, roof-mounted or otherwise unitary VOC-containing gas treatment systems of the prior art, as described hereinearlier, the approach to process control has been to operate the treatment system in a "lean running" mode with relatively low concentration of VOCs in the influent gas stream, e.g., by addition of dilution air to the feed gas stream flowed to the treatment system, and to add fuel such as natural gas or propane to the feed gas stream as necessary, to provide the desired level of heating of the influent gas stream for subsequent catalytic oxidation treatment.

The VOC treatment system of the present invention overcomes the deficiencies of the prior art, by operating in the autothermal catalytic oxidation regime, and thereby (in comparison with the large-scale, roof-mounted or otherwise unitary VOC-containing gas treatment systems of the prior art) achieves a significant degree of size reduction, with a significantly smaller heat exchanger and a substantially reduced volume of oxidation catalyst, in a point-of-use system. Such point-of-use system is advantageously located in close proximity to the VOC emission source, and permits the point source emissions of VOCs to be treated at a location in the process plant where the VOCs are at their highest concentration.

Treating the VOCs in the process facility at the emission source is desirable for the following reasons: (i) the total volume of air added to the VOC-containing gas stream for catalytic oxidation can be substantially reduced, e.g., by a factor of 4–6, relative to large-scale, roof-mounted or otherwise unitary VOC-containing gas treatment systems of the prior art; and (ii) the energy efficiency of VOC oxidation in the point-of-use catalytic oxidation system is very greatly improved relative to such prior art systems.

With the point-of-use catalytic oxidation system of the invention, it is possible to achieve a very close approach to the long-sought goal of utilizing "zero emission tools" in the process plant, e.g., a semiconductor manufacturing facility.

Referring now to the drawings, FIG. 1 is a schematic flow sheet of a point-of-use catalytic oxidation VOC treatment system 100 according to the invention, in one embodiment thereof.

The gas stream enters the VOC treatment system 100 in feed line 12 from process plant VOC source 10, which may comprise a semiconductor manufacturing tool. A smoother and/or concentrator 14 provides preliminary conditioning of the gas stream to provide a VOC-containing gas stream of appropriate VOC concentration levels for subsequent processing The pressure of the influent VOC-containing gas stream may be monitored upstream and/or downstream of the smoother/concentrator 14, and the sensed pressure may be employed to adjust other system operating components or process conditions, to achieve high efficiency, autothermal operation. A variable speed pump or blower (not shown in FIG. 1) may provide appropriate head pressure to overcome the pressure drops in the rest of the system, so that the pressure at the upstream tool is held constant, by varying the speed of the pump or blower.

A weak adsorber (smoother) unit 14 may be employed at the inlet end of the VOC treatment system of the invention, to "smooth" or attenuate the concentration spikes of VOC components in the VOC-containing feed gas stream passed to the treatment system in line 12. The catalytic oxidation system functions most efficiently if the concentration of VOC species in the gas stream flowed to the catalytic oxidation bed is fairly constant. The smoother thus is employed to weakly interact with the incoming VOC species, so that the spikes of such VOC species are reduced by dynamic sorption/desorption interaction with the sorbent medium, to enhance operational efficiency of the VOC removal catalytic oxidation process.

In the VOC treatment of gas streams from IPA dryers, peaks of isopropanol concentration can be on the order of 15000 ppm. Such high concentration would otherwise lead to very high temperatures in the catalytic oxidation bed (>>800° C.). High temperatures of this magnitude would be difficult to relieve and control, in the absence of a smoother. If a smoother is operated to reduce the peak concentration of IPA to a significantly lower concentration, e.g., on the order of 3000 ppm, heat management becomes substantially easier and the efficient operation of the catalytic oxidation treatment system in an autothermal mode is facilitated.

By the appropriate choice of sorbent medium, the smoother can be tailored to absorb VOCs to varying degrees. Illustrative of sorbent media which may be usefully employed in the broad practice of the invention, are metal oxides such as alumina, silica, zeolites, and other clays, as well as activated carbons, etc. The size and geometry of the smoother sorbent bed may be widely varied to achieve a desired adsorption characteristic for the VOCs being treated.

Alternatively, the front-end treatment in process module 14 may comprise passage of the VOC-containing feed gas stream through a concentrator, to increase the concentration of VOC component from the gas stream to a level which is appropriate for autothermal catalytic oxidation operation in the treatment system.

As hereinafter described in greater detail, the concentrator 14 may comprise a rotating bed of sorbent medium which is partitioned to form sections of the rotating bed containing corresponding portions of the sorbent material. A VOC-containing feed gas stream then is flowed through a section of the rotating bed, to effect sorption of VOC from the feed gas stream on the portion of sorbent material in such section, to yield a reduced VOC gas stream which then is discharged from the rotating bed, and which, depleted in VOC content, may finally be discharged to the atmosphere, or flowed to other treatment or disposition steps.

The VOC species adsorbed on the sorbent material in the rotating bed then rotates with the sorbent to a desorption zone, which by virtue of the partitioning of the rotating bed is isolated from the active sorption step involving passage of the VOC-containing feed gas stream through the rotor. In such manner, the concentrator may be continuously operated.

A desorption gas stream is flowed to the sorbent material in the section or sections of the rotating bed which previously have contacted the VOC-containing feed gas stream. The desorption gas stream then flows through the sorbent material bearing the adsorbed VOC species, to effect desorption therefrom. There is resultingly produced a VOC-containing gas, comprising the desorbed VOC species and the desorption gas stream, having a higher VOC concentration then the original feed gas stream contacted with the sorbent medium.

In such manner, the concentration of VOC species in the gas discharged from the concentrator and containing the desorbate VOC species, is at a concentration level appropriate to the passage of such VOC-containing stream to the catalytic oxidation bed, with concurrent maintenance of autothermal catalytic oxidation conditions in the treatment system.

In the autothermal operation of the VOC treatment system of the invention, the system is operated to recover the heat in the catalytically oxidized process gas stream before the discharge of the finally treated, VOC-reduced gas to the atmosphere. Temperatures in the range of 350 to 450° C. are typically required for catalytic conversion of VOCs to carbon dioxide and water. If the VOC-containing gas were simply heated, catalytically oxidized to remove VOC therefrom, and then released to atmosphere, the cost of heating would be prohibitive.

Autothermal operation thus requires heat recovery from the catalytically oxidized effluent gas having reduced VOC content. The heat content of such catalytically oxidized gas stream is also dependent on the VOC content of the VOC-containing gas stream which is flowed in the first instance to the catalytic oxidation step of the process. If the concentration of VOC in such VOC-containing gas stream is too low, the heat produced by exothermic catalytic oxidation will be correspondingly low, and afford inadequate recovered heat for preheating the VOC-containing gas stream introduced to the treatment system. Accordingly, to ensure and maintain consistent autothermal catalytic oxidation in the treatment system, it is necessary to maintain VOC concentration in the gas stream introduced to the catalytic oxidation step at an appropriate significant level.

The smoother and/or concentrator 14 in the FIG. 1 system function(s) to provide such appropriate VOC concentration in the gas stream being treated.

It is to be recognized that in some instances, the smoother/concentrator 14 may not be required, if the VOC concentration of the gas stream introduced into the process treatment system 100 is of an appropriate concentration level.

The VOC-containing gas stream then flows in inlet conduit 16 to the VOC treatment system which may be encased in a unitary housing, box, cabinet or the like (represented in FIG. 1 by the dashed line rectangle 40).

The VOC-containing gas stream from line 16 flows to fan or blower 18, which may for example comprise a variable speed pump to provide head pressure to overcome the pressure drops in the rest of the treatment system, and to hold pressure at the process plant VOC source 10 constant, by varying the speed of the pump. By way of specific example, the fan/blower 18 may comprise a DR 707 Regenerative blower, commercially available from EG&G Rotron, Saugerties, N.Y.

From the fan/blower 18, the VOC-containing gas stream is flowed in line 20 to heat exchanger 22. Heat exchanger 22 defines a first gas flow path, represented schematically as heat exchange passage 24, for the VOC-containing gas stream. The heat exchange passage 24 is in heat transfer relationship with a second gas flow path schematically represented in FIG. 1 as heat exchange passage 26. The first gas flow path (passage 24) and second gas flow path (passage 26) are in heat exchange relationship with one another, to effect heat recovery from a VOC-reduced gas stream flowing in passage 26 (as hereinafter more specifically described) for cooling of the VOC-reduced gas stream in passage 26, and for preheating the VOC-containing gas stream flowing through heat exchanger 22 in heat exchange passage 24.

It will be appreciated that the heat exchange passages 24 and 26 are schematically represented as single passages for simplicity, it being recognized that such heat exchanger may for example comprise a shell-and-tube heat exchanger including one or a multiplicity of shell-side and tube-side gas flow passages.

By way of specific example, the heat exchanger 22 may comprise a counter-flow shell-and-tube heat exchanger including 145 tubes having 0.75 inch inner diameter, and a length of 48 inches, yielding a tube side heat transfer surface of 113.8 square feet. It will be recognized that the heat exchanger may be of any suitable type, comprising or defining any desired number of constituent heat transfer passages, and that the specific heat transfer area provided by the heat exchanger may be widely varied within the broad practice of the present invention. In general, however, for a point-of-use VOC treatment system, the heat exchanger may suitably have from about 25 to 500 square feet of tube side heat transfer area, more preferably from about 50 to about 300 square feet, and most preferably from about 80 to about 200 square feet of tube-side heat transfer area.

The VOC-containing gas thus is preheated in heat exchanger 22 to a suitable elevated temperature for subsequent processing.

As described hereinafter in greater detail, the heat exchanger 22 comprises heat exchange passage 24 which is advantageously configured and arranged to provide a "dial-in" or selectively adjustable heat transfer capability, so that the enthalpy of the VOC-containing gas stream which is flowed through such heat exchange passage and ultimately is flowed to the catalytic oxidation zone 34 for VOC destruction therein, is selectively adjustable to a predetermined level appropriate to the maintenance of autothermal catalytic oxidation conditions in the catalytic oxidation zone 34.

As mentioned earlier herein, a recurrent problem with prior art catalytic oxidation VOC abatement systems is their lack of flexibility in response to frequently changing chemistries, tool sets, operating conditions, etc., unless the abatement system is vastly overdesigned and thus incapable of sustaining autothermal catalytic oxidation operation except at peak VOC loading conditions.

The catalytic oxidation VOC abatement system of the present invention overcomes such deficiencies of the prior art in the provision of a flexible point-of-use system which can handle a wide variety of VOC duties deriving from changed tools, operating conditions, and chemistries.

More specifically, the catalytic oxidation system of the present invention utilizes the concept of "dialed in" heat recovery, in which the heat flux (enthalpy transfer) from the catalytically oxidized, VOC-depleted stream to the VOC-laden feed gas stream, is selectively adjustable in the heat exchanger by the selective introduction or removal of heat transfer enhancement elements to or from the heat transfer passage(s) of the heat exhanger, to correspondingly increase or decrease the heat transfer from the hot effluent gases exiting the catalytic oxidizer to the cool VOC-containing stream being heated to higher temperature for catalytic oxidation of the VOC content in such stream.

By providing a system which is capable of having heat transfer efficiency set at a selected discrete value, over a range of heat transfer efficiencies, the catalytic oxidation system can readily be tailored for the specific tool set, flow rates and chemistries being utilized.

Such capability is provided in the practice of the present invention by the use of heat transfer-enhancing flow inserts.

These heat transfer inserts, which may be selectively emplaced in the heat transfer passage(s), e.g., heat exchange tubes, of the heat exchanger, can change the heat recovery of the cool (VOC-laden) gas stream flowed through a given heat exchanger passage by a factor of up to, and in excess of, 4.

This means that a simple single shell-and-tube heat exchanger can be designed in which thermal efficiency can be varied from as high as 80% to as low as 20%, if so desired, over a single flow condition, based on whether the heat exchanger tubes have tube inserts installed or not installed. Because most practical heat exchangers will have a multiplicity of tubes, a desired heat recovery efficiency can be "dialed in" by filling some tubes with heat transfer inserts but not filling all tubes with inserts.

The key in such attainment of a desired level of heat transfer in the shell-and-tube heat exchanger, is ensuring that the heat transfer coefficient on the shell side is not limiting. As long as the heat transfer coefficient on the tube side is limiting or equal to the heat transfer coefficient on the shell side, with or without heat transfer inserts, the heat exchanger performance will be very sensitive to the use of the heat transfer inserts on the tube side.

This feature allows the catalytic oxidation system to be quickly "custom designed" for each application in the sense of thermal efficiency, but such customization is achieved not through wholesale change-out of heat exchangers, or other costly structural reconstruction, but rather through the simple expedient of using a low cost tube insert.

Since all of the tube inserts can be identically fabricated For all the catalytic oxidation systems which are used, two mass-produceable parts, viz., the catalytic oxidizer and the tube inserts, can be easily combined to provide autothermal operation for any of a plethora of "custom-designed" VOC effluent abatement applications.

Minimal equipment modification therefore is required, in the simple and readily effected removal or addition of heat transfer inserts, to provide a given level of heat transfer which corresponds to autothermal operating conditions in the catalytic oxidizer.

This aspect of the present invention provides a significant advantage over other types of catalytic oxidizers lacking such selective-setting heat transfer feature. The improvement afforded by such "dial-in" heat transfer capability is especially significant when applied to point-of-use VOC abatement when tool sets, operating conditions (e.g., flow rates), and chemistries are significantly altered, particularly when such changes are periodic or irregular, during the operation of the VOC abatement system.

Referring again to FIG. 1, the preheated gas stream is discharged from heat exchanger 22 in line 28, and flowed to supplemental heater 30, which may be of gas-fired, electric resistance, or other suitable type, serving to provide supplemental heating, if and as required, to the VOC-containing gas stream in line 28, to bring such stream to a temperature appropriate to autothermal catalytic oxidation.

The supplemental heater thus may be arranged with suitable temperature sensors (not shown) sensing the temperature of VOC-containing gas discharged from the heat exchanger 22 in line 28, and responsively providing supplemental heating to an elevated temperature of appropriate level for autothermal catalytic oxidation operation.

Additionally, at system start-up, it may be necessary to provide substantial heating from the supplemental heater, to bring the gas streams in the VOC treatment system up to suitable elevated temperature operating levels.

From supplemental heater 30, the VOC-containing gas stream at appropriate temperature is flowed in line 32 to the catalytic oxidation module 34 which may suitably comprise a mass of oxidation catalyst of appropriate composition, which serves to catalytically oxidize the VOC content of the gas stream flowed therethrough, producing carbon dioxide and water as product gases.

The catalytic oxidation module 34 may comprise a containment vessel or chamber, which contains oxidation catalyst of any suitable composition, e.g., in the form of a catalytic metal composition on a support. The catalytic metal composition may for example comprise platinum, palladium, platinum/rhenium, or any other catalytically active metal species or composition, effective to carry out the catalytic oxidation operation. The catalytic metal composition may be provided on a suitable support, such as a crimped metal foil, monolithic support, or other support medium and/or conformation, as appropriate to the specific treatment being carried out in the catalytic oxidation module 34.

The VOC-reduced gas stream yielded by the catalytic oxidation operation in module 34 then is discharged in line 36 and is passed in such line to heat exchange passage 26 in heat exchanger 22, as previously described, to preheat the influent VOC-containing gas stream, and to cool the VOC-reduced gas stream, thereby recovering the heat generated in the catalytic oxidation process. The thus-cooled VOC-reduced gas stream then is discharged from heat exchanger 22 in effluent discharge line 38, and may be vented to the atmosphere, or flowed to other end use treatment and/or disposition.

In accordance with the present invention, the heat exchanger 22, supplemental heater 30, and catalytic oxidation material in module 34 are sized, constructed, arranged, and operated to effect autothermal catalytic oxidation of VOC in the treatment system. The heat exchanger 22 thus is provided with a multiplicity of heat transfer-enhancing inserts, e.g., the inserts 3 and 5 shown in FIG. 1, wherein the insert 5 is depicted as being insertable into the heat exchange passage 24, and with the heat transfer-enhancing insert 3 being non-inserted, but available to be inserted should altered operating conditions, chemistries, tools, etc. necessitate such modification of the heat exchanger arrangement (or alternatively the heat exchange-enhancing insert 5 after insertion being selectively removable if altered operating conditions, chemistries, tools, etc., so require). By such heat transfer insert removal or insertion, the heat exchange can be adjusted to a predetermined character for autothermal operation, whereby the catalytic oxidizer operates most efficiently, and supplemental heating energy consumption is minimized.

Thus, while the specific temperatures, pressures, flow rates, and compositions of streams in the VOC treatment system 100 may be widely varied in the broad practice of the present invention, the specific operating conditions are selected, established and maintained, and the heat exchange in heat exchanger 22 is selectively adjusted by appropriate insertion or removal of heat transfer inserts, to facilitate and maintain autothermal catalytic oxidation in the VOC abatement system.

In general, for autothermal catalytic oxidation, the mass of catalytic oxidizer material in module 34 is suitably maintained at a temperature in the range of from about 150° C. to about 450° C., and more preferably from about 200° C. to about 375° C. The treatment system is suitably arranged to recover at least 50% of the heat from the VOC-reduced gas stream discharged from the catalytic oxidation step, for preheating of the VOC-containing gas stream subsequently subjected to catalytic oxidation treatment. Preferably, from about 50 to about 90% of the heat from the VOC-reduced gas stream is recovered for preheating of the VOC-containing influent gas stream, and more preferably from about 60% to about 80% of such heat from the VOC-reduced gas stream is recovered for preheating of the VOC-containing influent gas stream.

In view of the small size and compact character of the heat exchanger employed to recover heat from the VOC-reduced gas stream and to preheat the influent VOC-containing gas stream, it is highly desirable in the broad practice of the present invention to provide a multiplicity of selectively removably installable gas flow stream interrupting inserts, which are removably positionable in the tubes of a shell-and-tube heat exchanger, or otherwise selectively deployable in the first gas flow path through which the VOC-containing gas stream is flowed for preheating thereof. In such manner, the heat exchanger may suitable comprise at least one of such gas-flow stream interrupting inserts installed therein, to selectively enhance the heat transfer coefficient and heat flux achieved by heat exchange therein. The provision of heat transfer inserts in accordance with the present invention permits the heat exchanger to be compactly configured, which in turn facilitates the construction of the VOC oxidation system of the present invention in a unitary housing configuration of exceedingly small size, relative to the single plant VOC treatment systems of the prior art.

Suitable tube inserts of such type are described in G. Polley, "Tube Inserts Boost Two-Phase Heat Transfer," Chemical Technology Europe, January/February 1995. Other gas flow stream interrupting inserts are disclosed in U.S. Pat. No. 4,481,154 to Gough et al.

By the provision of such multiple inserts, the inserts may be selectively inserted or removed as desired or necessary, to achieve a given heat flux for heat exchange between the VOC-containing influent gas stream and the VOC-reduced gas stream discharged from the catalytic oxidation step. Accordingly, by selective deployment of such heat transfer inserts, it is possible to readily configure or reconfigure the VOC treatment system to provide a desired level of heat flux in the heat transfer step, as appropriate to the achievement of autothermal catalytic oxidation in the treatment system.

Figure 2:
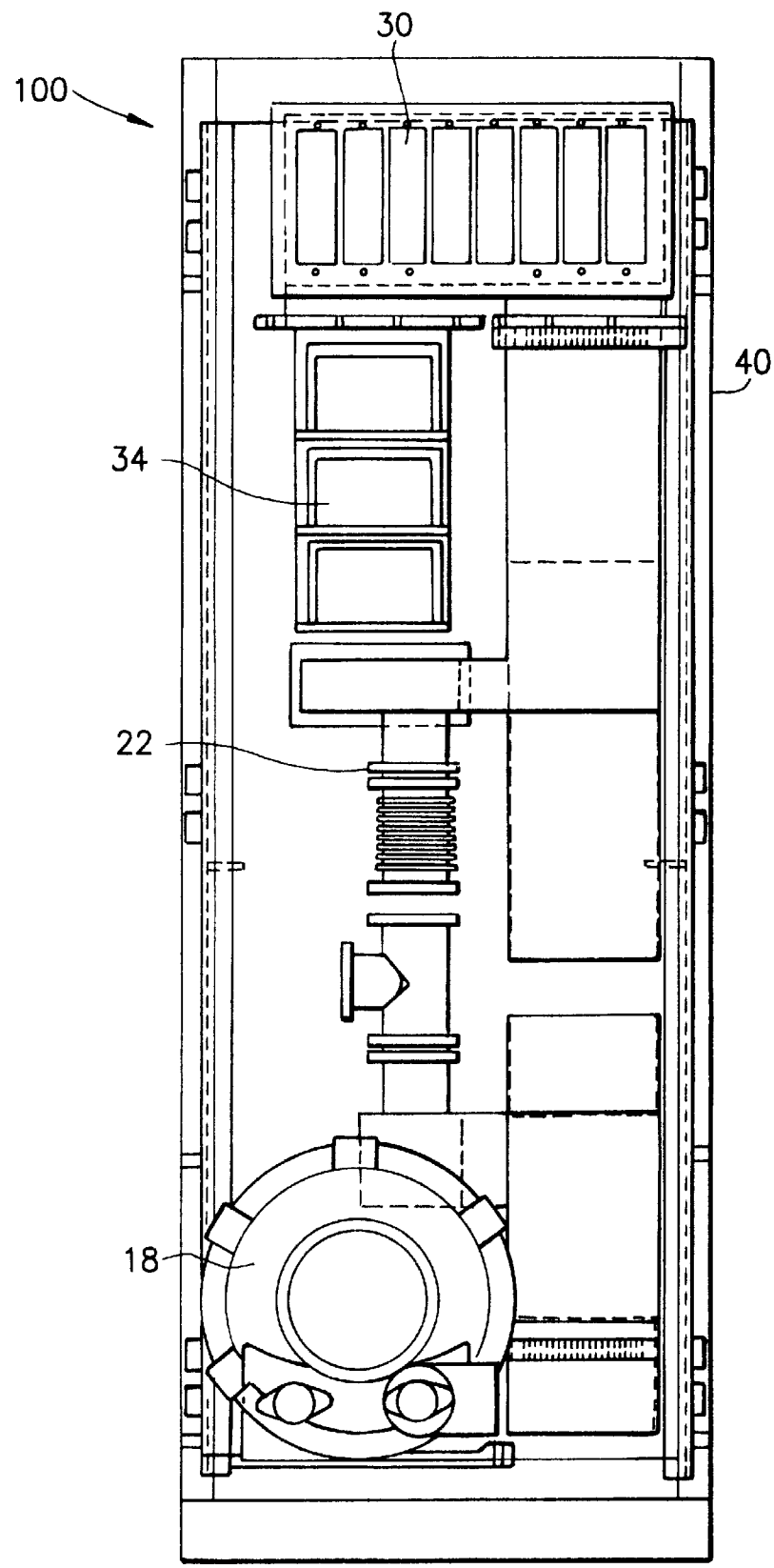
FIG. 2 is a schematic view of a catalytic oxidation system according to the invention, in a unitary cabinet conformation.

FIG. 2 is a schematic representation of a particular embodiment of the system whose flow sheet is shown in FIG. 1, as provided in a cabinet 40 containing therein the fan/blower 18, heat exchanger 22, supplemental heater 30, and catalytic oxidation module 34, in a compact unitary arrangement.

For typical applications such as the point-of-use VOC treatment of semiconductor processing gases, e.g., isopropanol, n-butyl acetate, cyclohexanone, xylene, ethyl lactate, etc., the cabinet volume typically does not exceed about 50 cubic feet, and the cabinet has a footprint area which typically does not exceed 10 square feet, with a cabinet height on the order of 5 to 10 feet. Thus, the unitary point-of-use system is of a size and character accommodating its positioning in a semiconductor manufacturing facility or other process plant, without occupying significant floor space in the process facility.

Figure 3:
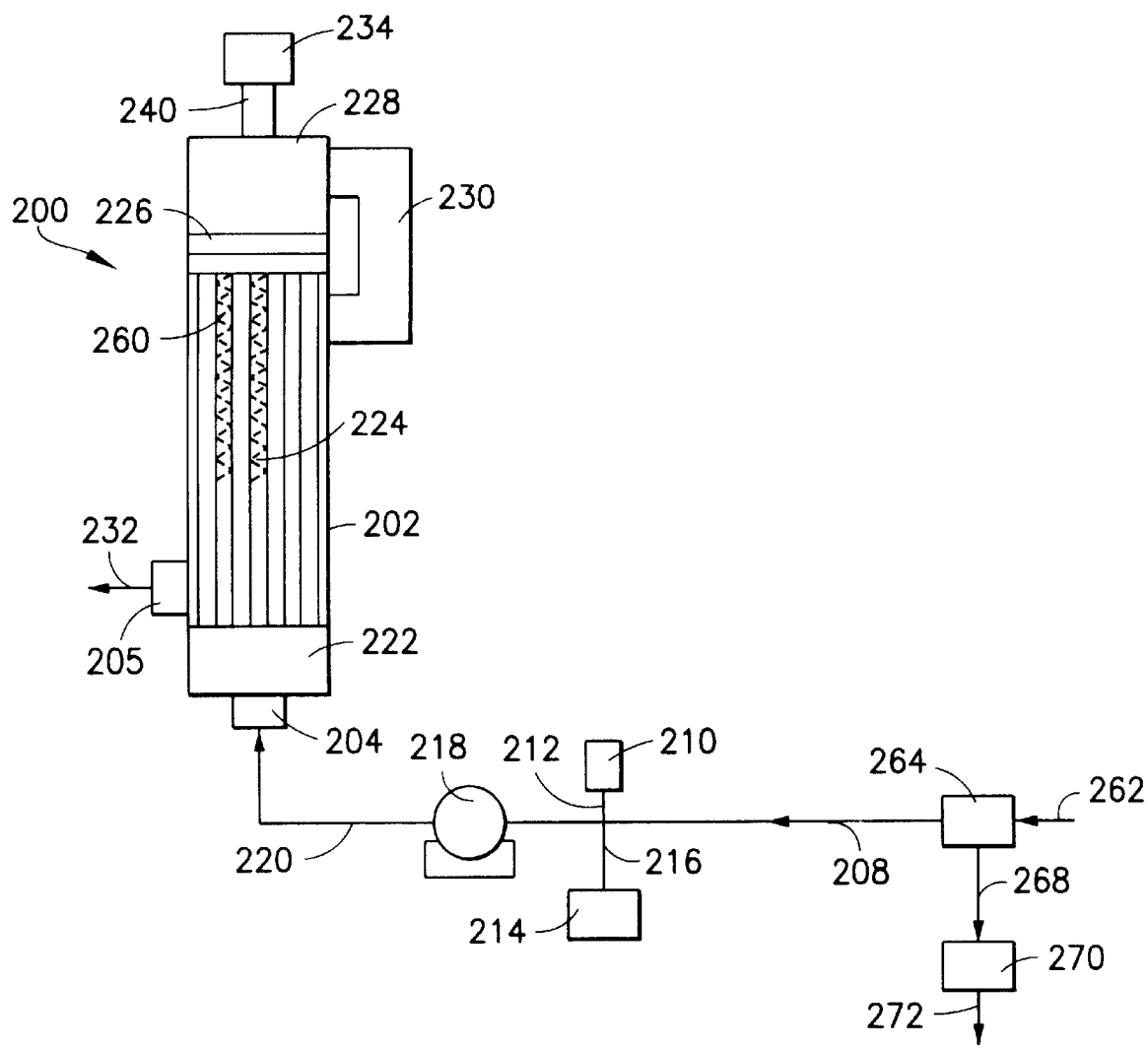
FIG. 3 is a schematic representation of a VOC treatment system according to another embodiment of the invention, with capability for the removal of HMDS from the effluent stream, when same is present in gas streams from the process facility.

FIG. 3 is a schematic representation of a catalytic oxidation VOC treatment system 200 according to another embodiment of the invention, with capability for the removal of HMDS from the effluent stream, when same is present in gas streams from the process facility, such as when the effluent stream derives from a photolithography track or a multiplicity of photolithography tracks in the process facility.

As shown in FIG. 3, the treatment system 200 comprises a unitary housing 202, featuring inlet 204 and outlet 205 communicating with the interior volume of the housing. The treatment system includes a weak absorber smoother section 222 in housing 202 just after the inlet 204. The weak absorber smoother section 222 operates as previously described, to attenuate spikes of high concentration of VOC species.

The smoother section comprises a weak sorbent material, e.g., a metal oxide such as alumina, silica, zeolite, or a physical sorbent such as activated carbon, etc. The sorbent material in the smoother has a weak affinity for the VOC species, and serves to temporarily "hold up" significant excesses of VOC component in the feed gas stream, so that the gas discharged from the smoother is relatively more uniform in composition over time. The smoother may for example be sized to accommodate a significant flow rate of influent VOC-containing feed gas, e.g., 1000 SCFM (standard cubic feet per minute) of such gases.

The smoothed VOC-containing gas discharged from the smoother is flowed to the countercurrent heat exchanger 224, in which the VOC-containing gas stream is warmed to appropriate temperature for autothermal catalytic oxidation, by heat exchange with catalytically oxidized hot gas effluent flowed to the heat exchanger by hot gas return 230. In such manner, the hot gas from the catalytic oxidation is cooled and the VOC-containing gas stream is warmed.

The warmed VOC-containing gas stream then flows to the bed 226 of oxidation catalyst, in which the VOC content is reduced in the gas stream, by autothermal catalytic oxidation. The resulting VOC-depleted hot gas flows into plenum 228 at the upper end of the housing 202 and then is flowed through the hot gas return 230 as previously described.

The housing 202 in FIG. 3 is provided at its upper end with an excess heat relief valve 234 joined to gas flow passage 240, for temperature control of the VOC treatment system.

At the lower-right portion of FIG. 3 the VOC-containing gas from the process facility (not shown) enters the treatment system in line 208. Such VOC-containing gas may be generated by a tool, manufacturing sub-system, or other source of VOC-containing gas. Such VOC-containing gas is flowed in line 208 past the bleed valve 214 coupled with line 208 via branch conduit 216, and past pressure transducer 210 coupled to line 208 via pressure sensing gas flow conduit 212. The gas from line 208 enters blower or pump 218, which effects flow of the VOC-containing gas at an appropriate rate in line 220 to the inlet 204 of the treatment system housing 202, for introduction to the smoother 222.

The pressure transducer 210 may be operatively coupled (by a means not shown) to blower or pump 218, to controllably adjust such fluid-impelling means, so that the pressure and flow rate of gas in line 220 are maintained at an appropriate value for autothermal catalytic oxidation operation in the treatment system 200.

The heat exchanger 224 as shown may comprise a multiplicity of heat transfer inserts 260 disposed in the interior bores of the tubes of the heat exchanger, as shown. Such inserts 260 disrupt the flow stream of the VOC-containing gas passed through the interior tube passages, to thereby adjust or establish the heat transfer coefficient and heat flux of the heat exchanger at an appropriate level for autothermal catalytic oxidation operation.

The FIG. 3 system as shown also provides an optional capability for the removal of HMDS from the effluent stream passed to the abatement system, when HMDS is present in the gas stream from the process facility, such as when the process facility contains photolithography tracks.

By utilizing a point-of-use effluent treatment system as shown in FIG. 3 for the abatement of HMDS, it is possible to selectively remove HMDS and thereby carry out VOC abatement without harming the performance of the catalytic or thermal oxidation system. Tools which utilize HMDS as a primer for silicon wafers, typically utilize an HMDS priming chamber in the tool, and tend to have their exhaust flows segregated in such a fashion that the VOC-laden flow is separate from the HMDS-laden flow. While the HMDS must be abated in order to meet regulatory requirements, it can be abated separately from the VOC flow. The VOC-laden flow can be routed to the catalytic oxidation system for treatment as described hereinabove with reference to FIG. 3. The HMDS-laden flow can be routed to a separate system for abatement, as shown.

The HMDS remover system can be a stand-alone system receiving the HMDS fumes from a single phototrack or a multiplicity of phototracks, or it can be a small module incorporated into the cabinet or housing 202 within which the VOC oxidation system resides.

This HMDS remover system is made economical by the fact that the HMDS-laden flows within a photolithography track tend to be much smaller than the VOC-laden flows. Typically, the VOC-laden flows from a photolithography track will be approximately 45 to 95 SCFM per coater bowl, while the HMDS-laden flows from a vapor prime oven will be approximately 5 SCFM or less. This makes the HMDS abatement system only an incremental piece of equipment which is integratable with the VOC abatement system.

The HMDS abatement system which is employed in the broad practice of the present invention can be any of various suitable types.

One HMDS removal option is to use a water scrubber, operating in either a neutral, acidic or basic environment. HMDS is a highly unstable molecule which readily breaks up to form hexamethyldisiloxane (HMDSO) and ammonia when exposed to water, acids or bases. In a large number of air regulation regions, volatile methyl siloxanes have been shown to not be ozone-depleting substances. HMDSO is a rather innocuous compound and not an ozone-depleting substance like HMDS.

Another option is to use a small burner system such as an electrically-heated tube or a small pilot flamed burner to decompose or oxidize the HMDS. Alternatively, the HMDS can be decomposed or oxidized in a heated ceramic bed. Because HMDS is extremely surface-reactive in nature, exposure to low, medium or high temperatures will cause the material to decompose in an oxidizing environment, forming $SiO_2$ particulates.

The oxidized material can then be exhausted directly to the atmosphere, or the treated fume can be run through a filter, baghouse or cyclone and the clean fume then directed to the shell side of the VOC oxidizer heat exchanger where the heat of combustion of the HMDS, along with the ignition heat and fume supplemental heat used to heat the HMDS stream, can be recovered back into the VOC oxidation process, thereby lowering the operating costs of the effluent treatment system.

Referring more specifically to FIG. 3, an HMDS-containing and/or VOC-containing stream flows into the effluent treatment system in line 262. In instances where the HMDS- and VOC-containing flows are segregated in character, a router 264 may be selectively employed to divert the HMDS-laden gas stream in line 268 to the HMDS removal unit 270, which may comprise any of the removal treatment systems described illustratively hereinabove, from which an HMDS-depleted stream is discharged in line 272 from the treatment system.

Alternatively, if the HMDS and VOC content of the gas stream is commingled in the gas flowed in line 262 to the effluent treatment system, then element 264 of the system may comprise an HMDS removal unit, which again may be of any of the types discussed hereinabove for effecting removal of HMDS from process gases. The resulting HMDS-depleted stream then is flowed in line 208 for feed to the VOC abatement system.

Thus, the VOC treatment system of the present invention may be integrated with suitable process equipment for the abatement of HMDS or other effluent gas species that may be deleterious in respect of the VOC removal treatment, in an arrangement in which the effluent generated by intermittent or cyclical generation of HMDS or other species is directed to a dedicated effluent treatment module for reduction or removal of such species, and the portion of the effluent gases not containing HMDS or other deleterious species is directed to the thermal or catalytic VOC removal system of the invention.

Figure 4:
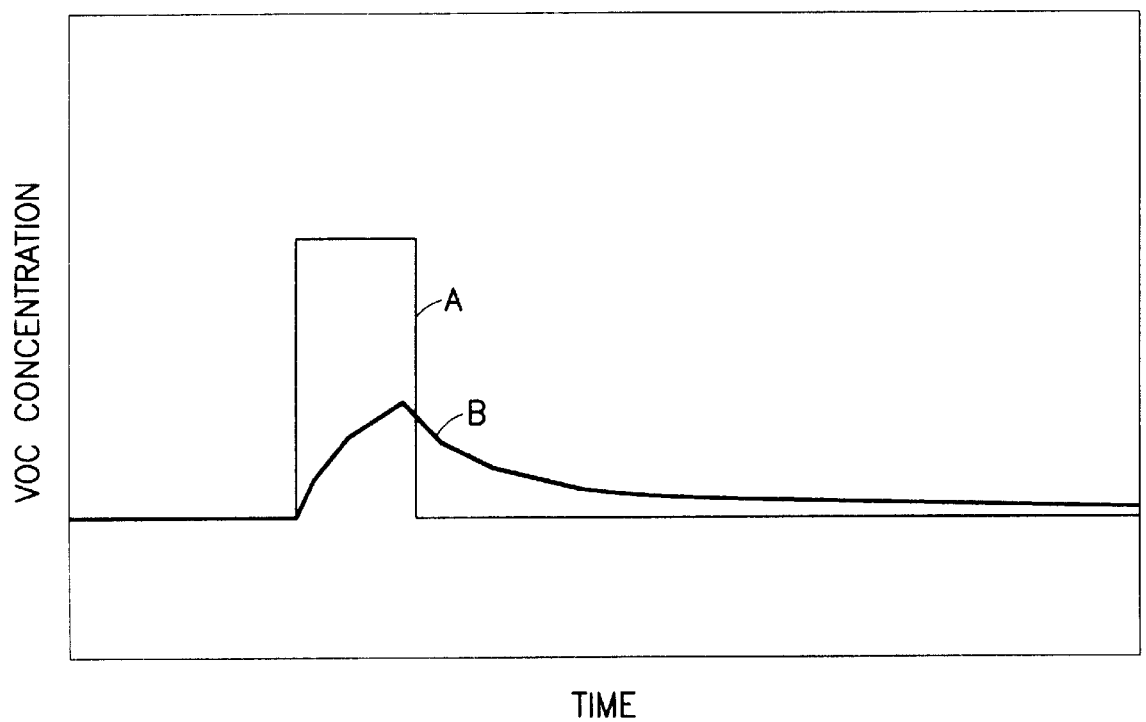
FIG. 4 is a graph of VOC concentration of an influent VOC species to a catalytic oxidation system of a type as schematically shown in FIG. 3, as a function of time (curve A), together with a corresponding plot of the damped concentration curve for the gas stream exiting the smoother module in the system (curve B).

FIG. 4 is a graph of VOC concentration, for a VOC species of interest, as a function of time, in which curve A describes a step function increase and sudden decrease of concentration, as a VOC component spike in the gas stream entering the VOC treatment system. By contacting such gas stream with the smoother as described hereinabove, the spike of VOC component is damped in the gas stream exiting the smoother, to the concentration versus time profile of curve B. In FIG. 4, curve B is superimposed on curve A, for ease of reference.

It will be recognized that the damped concentration profile for total VOC concentration or the damped concentration profiles for individual VOC components may vary widely, and that in specific instances, depending the VOC components in the effluent gas stream and the sorptive affinity of the smoother sorbent medium for such components, the damped VOC profiles may vary significantly from the single smoothed total VOC curve shown in FIG. 4, and may comprise a series of attenuated sub-peaks or other conformation of differing appearance and character. In all instances, however, the smoother is constructed and operated to reduce the amplitude of the VOC concentration spikes that would otherwise place an excessive VOC load on the effluent treatment system, and to distribute the VOC load over time, so that the effluent treatment system may be constructed and operated more effectively than in the absence of the smoother.

It will be apparent that the provision of such a smoother at the inlet portion of the VOC-containing gas treatment system of the invention, functions to attenuate the peak concentrations of VOC species that is seen by the subsequent portions of the treatment process. As a result, the VOC treatment system may be designed for heat exchange, supplemental heating, and catalytic oxidation on the basis of a reduced maximal VOC concentration, as provided by the smoother. In such manner, the provision of a smoother in the treatment system of the present invention permits such system to be constructed in a highly compact manner, with a significantly smaller heat exchanger, supplemental heater, and catalytic oxidation bed, than would otherwise be the case in the absence of such smoother apparatus.

Figure 5:
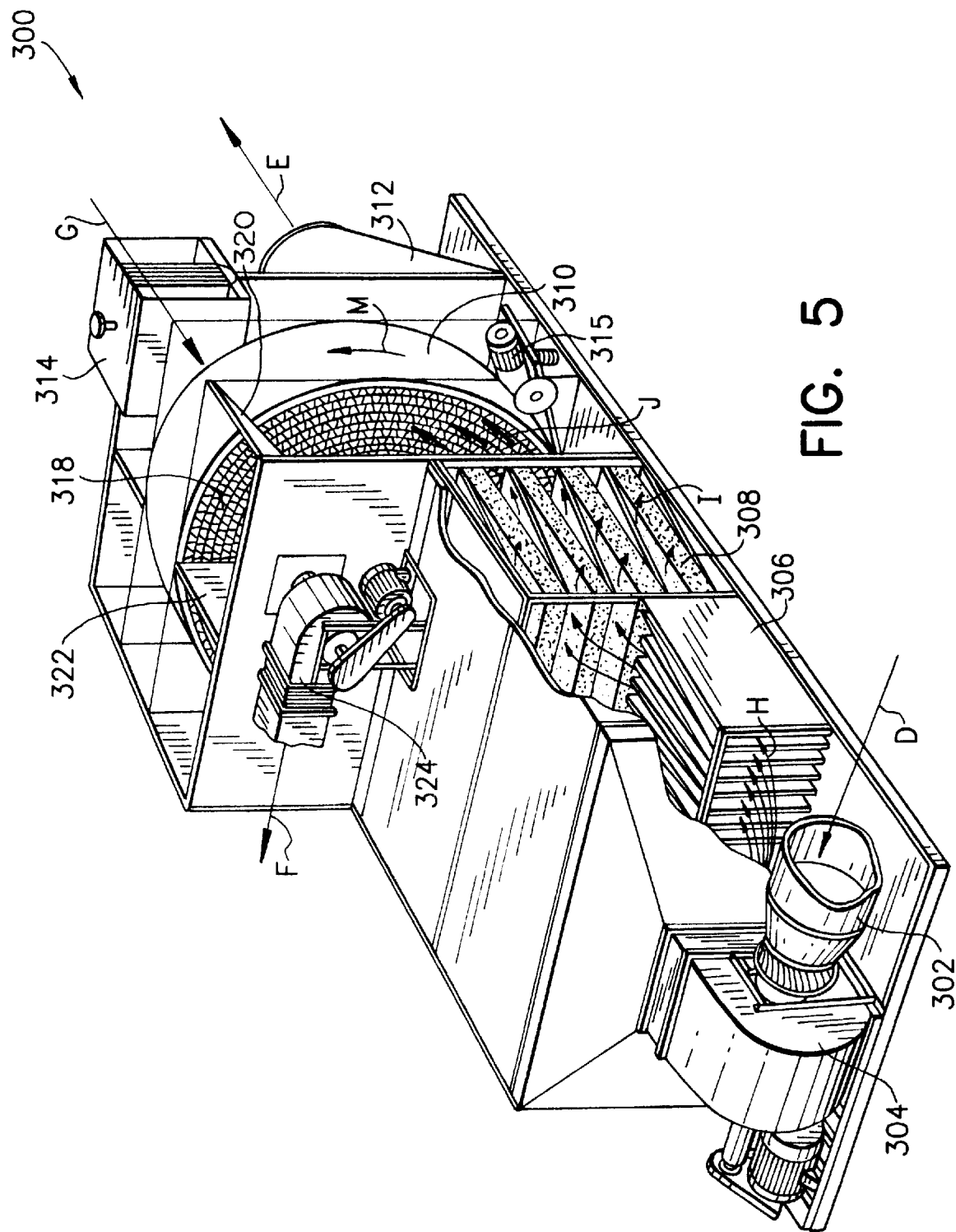
FIG. 5 is a schematic perspective view of a concentrator such as may be employed to concentrate the VOCs in a gas stream to be treated by catalytic oxidation, in another aspect of the invention.

FIG. 5 is a perspective schematic view of a VOC concentrator 300 which may be usefully employed in the broad practice of the present invention, as for example in the manner shown and described in connection with FIG. 1 hereof. The concentrator may serve to consolidate VOC species from combined waste gas streams deriving from tools or other process equipment in a specific location of a process plant facility, or the concentrator may otherwise enhance the concentration of VOC species in a stream above the level produced in the first instance from the source of VOC-containing gas.

Concentration of the VOCs in a gas stream to be treated by catalytic oxidation, is highly desirable for several reasons: the overall size of the VOC system can be significantly reduced, e.g., by levels on the order of ~60% or greater, relative to large-scale, roof-mounted or otherwise unitary VOC-containing gas treatment systems of the prior art; the performance of the catalytic oxidation carried out in the VOC treatment system is enhanced relative to such prior art VOC treatment systems; and the energy usage in the VOC treatment system is improved by concentration of the VOC content of the gas stream to be treated.

As mentioned hereinabove, the point-of-use catalytic oxidation system of the invention is a highly compact system, relative to the large-scale, roof-mounted or otherwise unitary VOC-containing gas treatment systems of the prior art. It is able to be packaged in a cabinet or housing having a relatively small "footprint" (i.e., area of the floor or support surface on which the catalytic oxidation system is reposed in use) in the process plant in which it is deployed.

Reducing the overall system footprint is very important, particularly in semiconductor manufacturing plants ("fabs"), since space in such fabs is at a premium. By way of example, a nominal maximum flow for a point-of-use catalytic oxidation VOC treatment system according to the invention may be on the order of 200 cfm. To treat the VOC-containing waste gas streams produced by five tools in a semiconductor fab (each generating 200 cfm of exhaust gases), five point-of-use catalytic oxidation VOC treatment systems according to the invention may be employed. By utilizing one point-of-use concentrator which can reduce the contaminant-containing air by a factor of 12 (1000 cfm to 80 cfm), a single smaller point-of-use catalytic oxidation VOC treatment system according to the invention could be employed. The net reduction in footprint by such single point-of-use treatment system can exceed 60%.

As used herein, a point-of-use concentrator means a concentrator which resides and operates in the process facility near a VOC emission point or points. Airflow to point-of-use concentrator units typically will be on the order of 3000 cfm or less, and preferably 1000 cfm or less. Airflow from one or more VOC emission points may readily be conveyed through a concentrator to a point-of-use catalytic oxidation system according to the invention.

The utilization of a concentrator in the VOC treatment system, thereby increasing the VOC concentration in the contaminated air subsequently processed by the VOC treatment system, also enhances the energy efficiency of the catalytic oxidation. The net effect of the higher concentration is that the catalytic oxidation can more easily be operated autothermally (not requiring outside energy) and the catalytic oxidation operation can actually be a net heat generator.

More generally, concentrators usefully employed in the VOC treatment systems of the invention can be of any suitable type, as for example a fixed adsorption bed type or a continuous rotary concentrator type.

Using a fixed adsorption bed concentrator, the VOC may for example be preferentially adsorbed on a sorptive matrix comprising a material such as activated carbon, a macroreticular polymer (e.g., Amberlite® macroreticulate polymer, commercially available from Rohm & Haas Company, Philadelphia, Pa.), a zeolite, or similar porous material having an affinity for the VOC. The VOC may be suitably desorbed from the concentrator medium using some combination of heat (e.g., via thermal swing adsorption (TSA)), differential pressure swing adsorption (PSA), or both (TSA/PSA).

Alternatively, a bed of sorptive medium may be employed for sorptive concentration of the VOCs, in which the bed is resistively heated to effect desorption, and subsequently purged. A combination of resistively heating the beds under low pressure or vacuum conditions may be employed to significantly reduce the volume of the contaminated air stream.

Utilizing a rotary bed concentrator, the VOC are trapped on a rotating wheel containing the adsorbent and desorbed by backwashing, e.g., with hot air as the desorption medium. The design of the wheel may for example be a Ferris wheel-type design, wherein about ¾ of the working adsorbent is exposed to the contaminated air and ¼ of the wheel is isolated and being desorbed. A similar type system may be employed in which the wheel is perpendicular to the air flow (e.g., a carousel design). Vertical rotary bed units may also be employed for such purpose.

Referring again to FIG. 5, the stream of VOC-containing feed gas enters the process air inlet 302 in the direction indicated by arrow D and flows to fan 304, which discharges the VOC-containing feed gas in the direction indication by arrows H through particulate filter 306. The particulate filter 306 may comprise any suitable filtration media, as appropriate for filtering particulates and gross solids from the feed gas stream.

The resulting feed gas stream filtered of particulates then flows to the smoother filter 308, flowing in the direction indication by arrows I. The smoothing filter 308 may comprise a zeolite or other sorbent medium for which the VOC species in the gas stream have an affinity. The purpose of the smoothing filter 308 is to attenuate spikes of VOC species of interest in the gas stream introduced to inlet 302, as and to the extent required for effective operation of the concentrator.

The filtered VOC-containing gas stream then flows in the direction indicated by arrows J into the rotor 310, where VOC species are adsorbed and removed from the gas stream, to yield a VOC-reduced gas stream which then is discharged from gas outlet 312 in the direction indicated by arrow E.

The VOC-bearing sorbent medium in the rotor then is rotated, by rotation of the rotor by means of drive motor 315, which is coupled via suitable gearing to the housing of rotor 310 as shown. The VOC-laden sorbent medium is rotated into the sector 318 demarcated by circumferentially spaced-apart radial partitions 320 and 322, where the VOC-laden sorbent media is contacted with heated air or inert gas passed through the rotor segment, from desorption gas inlet 314, in the direction of arrow G which is opposite to the direction (indicated by arrow E) of VOC-reduced gas from the concentrator.

The desorption gas contacted with sector 318 of the rotor 310 effects desorption of the VOCs by thermal or concentration gradient. The resulting VOC-containing desorption gas stream then is discharged from the sector 318 and passes to desorption gas outlet 324, for final discharge from the concentrator in the direction indicated by arrow F in FIG. 5.

In such manner, the desorption gas removes the VOC from the rotor sorbent, preparing the rotor sorbent for further adsorption. A small volume desorbate stream thus is yielded which contains the VOC from the original feed stream, and such concentrated sorbate-laden stream then may be flowed from the concentrator to the VOC treatment process, for heating, optional supplemental heating, and catalytic oxidation, followed by recovery of heat from the catalytically oxidized gas stream, as previously described.

One particularly effective concentrator of the type shown in FIG. 5 is commercially available as Munters Zeol Rotor Concentrator (Munter Zeol, Amesbury, Mass.), in volumetric air flow capacities ranging from 6,000 to 33,000 cubic feet per minute (cfm).

The VOC sorption media used in the concentrator and/or smoother, when same are utilized at the front end of the VOC treatment process, may comprise any suitable sorbent medium, as hereinabove discussed. A particularly suitable sorbent medium for such purpose comprises hydrophobic zeolites having pore size in the range of 2–10 Angstroms, which are usefully employed to adsorb organic molecules of up to about 8 Angstroms in diameter. Alternatively, activated carbon may be employed for sorption of the VOC components of the feed gas stream in a smoother or concentrator.

As an illustrative example of the utilization of the VOC treatment system of the present invention for abatement of VOC contaminants in waste gases generated in a semiconductor manufacturing facility, the VOC treatment system of the present invention may be utilized in a semiconductor fab for treatment of VOC-containing gas streams deriving from fab equipment such as IPA dryers, photoresist coater bowls of lithotracks (not including bowls with hexamethyldisilazane, or bowls of alkaline developers), degreasers, and wet benches, and/or other tools or sources of VOC-containing gases.

In this respect, it is to be noted that the VOC treatment system of the present invention may be utilized in combination with other treatment units and treatment steps, to effect removal from the VOC-containing gas stream of other gas stream contaminants.

The VOC-containing gas stream may initially be processed through monitoring and sensing units, for process control and safety purposes. For example, the feed line through which VOC-containing gas is flowed may contain a detonation arrestor assembly, which functions in operation to prevent back propagation of deflagrations and detonations in the event of ignition of gas in the catalytic oxidizer system.

The gas containing VOC species may then be passed through an optional smoother, such as a weakly adsorbing bed of silica gel which serves to attenuate and time average discrete VOC concentration spikes which may be generated at the VOC source.

Dilution air may be provided for convective air flow through the VOC treatment system during process heat-up, or in the event of the incoming VOC-containing gas being nitrogen rich or oxygen lean, so that sufficient oxygen is present for catalytic oxidation, or air may be added in the event of thermal excursions within the catalytic oxidation bed.

Such air may be mixed with the VOC-containing gas stream by means of a static mixer or other mixing means or methods, upstream of a blower or other motive means for introduction of the VOC-containing gas stream to the heat exchanger of the VOC treatment system. Such mixing may be desired to eliminate hot spots and cold spots within the catalytic oxidation bed.

The blower or pump provides the motive force necessary to push the VOC-containing gas through the catalytic oxidation system, to provide the motive force necessary to draw dilution air into the system if and when required, and to maintain desired pressure at the inlet of the VOC treatment system. An optional bypass blower may also be provided, which serves to provide motive force necessary to divert VOC-containing gas to an exhaust system, with the catalytic oxidation bed in a "bypass" mode, if desired in the course of operation of the VOC treatment system.

The heat exchanger used to preheat the VOC-containing gas may comprise a shell-and-tube heat exchanger designed to achieve high thermal efficiency, e.g., 80% thermal efficiency, by heat exchange of the VOC-containing gas with the hot exhaust from the catalytic oxidation bed which has been depleted in VOC content.

A supplemental heater module may be provided in conjunction with the heat exchanger, to preheat the system on a cold restart, as well as to provide the supplemental heat necessary to heat the VOC-containing gas from the heat exchanger to a proper temperature for introduction to the catalytic oxidation bed, for autothermal operation.

The catalytic oxidation bed may be provided as a single bed catalytic reactor, or may comprise a series of component beds, arranged in any suitable fashion to effect catalytic oxidation of the VOC in the gas stream flowed through the bed of oxidation catalyst.

The process system may also comprise a suitable exhaust system which is arranged and constructed to bypass VOC-containing gas to final discharge or exhaust means, and to flow any thermal bypass exhaust from the discharge portion of the catalytic oxidation bed to vent or exhaust means.

The VOC treatment system may further comprise a control system for monitoring and controlling the system in its various modes of operation, e.g., to alarm or shut down the system in the event of an unsafe event being detected, and to provide for proper step sequencing and operating mode sequencing of the catalytic oxidation system.

As a further specific embodiment, the VOC treatment system may be housed in a 28 inch×32 inch×79.25 inch cabinet, i.e., 79.25 inches in height and having a 28 inch×32 inch footprint.

As used herein, the means for transporting gas between constituent steps or process elements of the treatment system may comprise pipes, conduits, ducts, or other gas flow conveying means. The blower or gas flow motive means in the VOC treatment system may comprise a regenerative blower, centrifugal fan, eductor, air-driven turbo-blower, or other suitable gas flow motive impelling means.

The heat exchanger employed in the VOC treatment process of the invention may comprise a heat exchanger of counter-flow shell and tube type with hot flow on the shell side and cold flow on the tube. The heat exchanger may, for example, comprise an inlet plenum, a main heat exchanger body containing the tube bundle with single pass tube side and with baffled cross-flow shell side, and a cool-end shell side expansion joint to accommodate differential thermal expansion/contraction effects.

The heat exchanger may be formed of any suitable material of construction. Tube inserts may be utilized in the tubes of the heat exchanger to increase the overall heat transfer coefficient of the system by a factor of 4 or more. Suitable heat transfer insert coils are readily commercially available, including coils manufactured by Cal Gavin Ltd. (United Kingdom), which promote enhanced heat transfer coefficients for laminar tube-side flows in the shell-and-tube type heat exchanger. The coils can be added or removed at will without modification of the basic heat exchanger structure. Such design flexibility allows the capacity to "dial-in" thermal efficiency to the specific application, by addition or removal of the insert devices in the heat exchanger.

Alternatively, tubes of the heat exchanger could be selectively occluded in a predetermined pattern, to adjust the overall heat transfer coefficient and heat flux for heat exchange to a desired level.

The catalytic oxidation module may comprise an outer module chamber housing, an outlet plenum, catalyst module (s), a catalyst module hold down mechanism to retain the module(s) in position, and a catalyst module access door, for selective introduction of oxidation catalyst to the module(s), or removal therefrom.

The oxidation catalyst of widely varying type, preferably utilizing a platinum catalyst coating over a monolithic or bead substrate. Alternative types of oxidation catalyst include cross-flow wire-substrate catalyst module(s), commercially available from Precision Combustion, Inc., crimped metal ribbon substrate catalyst module(s), commercially available from W. R. Grace and Co., ceramic monolithic substrate catalyst module(s), and ceramic bead substrate dump catalyst.

The VOC treatment system may be housed within a cabinet formed of suitable material of construction, such as sheet metal. The cabinet may be provided with a front door for access to the interior volume of the cabinet, and control panels may be provided as necessary or desirable for monitoring, control, and instrumentation purposes in the treatment apparatus.

While the invention has been described herein with reference to specific features, aspects, and illustrated embodiments, it will be recognized that numerous alternative variations, modifications, and other embodiments are contemplated and therefore are to be considered and construed as being within the spirit and scope of the invention as claimed.

What is claimed is:

1. A compact, point-of-use catalytic oxidation apparatus arranged for connection to an upstream semiconductor manufacturing process unit producing a VOC-containing gas stream, to receive said VOC-containing gas stream, and for treatment of said VOC-containing gas stream, said catalytic oxidation apparatus comprising:

a heat exchanger defining a first gas flow path for said VOC-containing gas stream and a second gas flow path for a VOC-reduced gas stream at higher temperature than said VOC-containing gas stream, wherein the first gas flow path and the second gas flow path are in heat exchange relationship with one another, to effect heat recovery from said VOC-reduced gas stream for cooling thereof, and to preheat the VOC-containing gas stream;

means for introducing the VOC-containing gas stream to the heat exchanger;

a supplemental heater for supplemental heating of preheated VOC-containing gas to an elevated temperature for catalytic oxidation of VOC therein;

means for passing the preheated VOC-containing gas stream from the heat exchanger to the supplemental heater;

a bed of catalytic oxidizer material for catalytic oxidation of VOC in the VOC-containing gas stream to yield the VOC-reduced gas stream;

means for passing the VOC-containing gas stream from the supplemental heater to the bed of catalytic oxidizer material for catalytic oxidation of VOC therein to yield the VOC-reduced gas stream;

means for passing the VOC-reduced gas stream from the bed of catalytic oxidizer material to said heat exchanger for flow through said second gas flow path thereof; and means for discharging a cooled VOC-reduced gas stream from the second gas flow path of the heat exchanger;

wherein the heat exchanger, supplemental heater, and bed of catalytic oxidizer material are sized, constructed and arranged to effect autothermal catalytic oxidation of VOC in said bed of catalytic oxidizer material;

means for controlling flow of said VOC-containing gas stream from said upstream semiconductor manufacturing process unit to said means for introducing the VOC-containing gas stream to the heat exchanger, to maintain a selected pressure at the upstream semiconductor manufacturing process unit;

said heat exchanger having a heat transfer area, with said heat transfer area in the range of from 25 to 500 feet$^2$; and a vertically upstanding cabinet containing said heat exchanger, supplemental heater, and bed of catalytic oxidizer material, with the cabinet having a footprint area not exceeding 25 feet$^2$, and the cabinet having a volume not exceeding 250 feet$^3$, whereby the cabinet is positionable in close physical proximity to said upstream semiconductor manufacturing process unit producing a VOC-containing gas stream, in a semiconductor manufacturing process facility.

2. A point-of-use catalytic oxidation apparatus according to claim 1, wherein the heat exchanger, supplemental heater, and bed of catalytic oxidizer material are sized, constructed and arranged to maintain the bed of catalytic oxidizer material at a temperature in the range of from 150° C. to 450° C.

3. A point-of-use catalytic oxidation apparatus according to claim 1, wherein the heat exchanger, supplemental heater, and bed of catalytic oxidizer material are sized, constructed and arranged to maintain the bed of catalytic oxidizer material at a temperature in the range of from 200° C. to 376° C.

4. A point-of-use catalytic oxidation apparatus according to claim 1, wherein the heat exchanger, supplemental heater, and bed of catalytic oxidizer material are sized, constructed and arranged to recover at least 50% of the heat from said VOC-reduced gas stream, in said preheated VOC-containing gas stream.

5. A point-of-use catalytic oxidation apparatus according to claim 1, wherein the heat exchanger, supplemental heater, and bed of catalytic oxidizer material are sized, constructed and arranged to recover from 50% to 90% of the heat from said VOC-reduced gas stream, in said preheated VOC-containing gas stream.

6. A point-of-use catalytic oxidation apparatus according to claim 1, wherein the heat exchanger, supplemental heater, and bed of catalytic oxidizer material are sized, constructed and arranged to recover from 60% to 80% of the heat from said VOC-reduced gas stream, in said preheated VOC-containing gas stream.

7. A point-of-use catalytic oxidation apparatus according to claim 1, wherein the heat exchanger comprises a shell-and-tube heat exchanger including shell-side and tube-side gas flow passages.

8. A point-of-use catalytic oxidation apparatus according to claim 7, wherein the heat exchanger first gas flow path for said VOC-containing gas stream comprises the tube-side gas flow passage and the second gas flow path for said VOC-reduced gas stream comprises the shell-side gas flow path.

9. A point-of-use catalytic oxidation apparatus according to claim 7, wherein said heat exchanger provides from 25 to 500 square feet of tube-side heat transfer area.

10. A point-of-use catalytic oxidation apparatus according to claim 7, wherein said heat exchanger provides from 50 to 300 square feet of tube-side heat transfer area.

11. A point-of-use catalytic oxidation apparatus according to claim 7, wherein said heat exchanger provides from 80 to 250 square feet of tube-side heat transfer area.

12. A point-of-use catalytic oxidation apparatus according to claim 7, wherein said heat exchanger provides from 100 to 200 square feet of tube-side heat transfer area.

13. A point-of-use catalytic oxidation apparatus according to claim 1, wherein the catalytic oxidizer material comprises a catalytic metal composition on a support.

14. A point-of-use catalytic oxidation apparatus according to claim 13, wherein said catalytic metal composition comprises platinum.

15. A point-of-use catalytic oxidation apparatus according to claim 13, wherein said support comprises a crimped metal foil.

16. A point-of-use catalytic oxidation apparatus according to claim 13, wherein said support comprises a monolithic support.

17. A point-of-use catalytic oxidation apparatus according to claim 1, further comprising means for effecting removal of hexamethyldisilazane from the VOC-containing gas stream prior to flow of the VOC-containing gas stream into the heat exchanger.

18. A point-of-use catalytic oxidation apparatus according to claim 17, wherein the hexamethyldisilazane removal means comprises a water scrubber or a burner, for removal of the hexamethyldisilazane from the gas flow stream.

19. A catalytic oxidation apparatus according to claim 1, wherein the means for controlling flow of said VOC-containing gas stream is contained in the cabinet.

20. A catalytic oxidation apparatus according to claim 1, wherein the means for controlling flow of said VOC-containing gas stream comprise a variable speed blower.

21. A catalytic oxidation apparatus according to claim 1, further comprising a multiplicity of heat transfer inserts, each of which is selectively positionable in the first gas flow path to vary the heat transfer in the heat exchanger and selectively removable therefrom, and wherein the first gas flow path contains at least one of said heat transfer inserts.

22. A compact, point-of-use thermal oxidation apparatus arranged for connection to an upstream semiconductor manufacturing process unit producing a VOC-containing gas stream, to receive said VOC-containing gas stream, and for treatment of said VOC-containing gas stream, said thermal oxidation apparatus comprising:

a heat exchanger defining a first gas flow path for said VOC-containing gas stream and a second gas flow path for a VOC-reduced gas stream at higher temperature than said VOC-containing gas stream, wherein the first gas flow path and second gas flow path are in heat exchange relationship with one another, to effect heat recovery from said VOC-reduced gas stream for cooling thereof, and to preheat the VOC-containing gas stream;

means for introducing the VOC-containing gas stream to the heat exchanger;

a thermal oxidizer for effecting thermal oxidation of VOC in the VOC-containing gas stream to yield the VOC-reduced gas stream;

means for passing the preheated VOC-containing gas stream from the heat exchanger to the thermal oxidizer for thermal oxidation of VOC therein to yield the VOC-reduced gas stream;

means for passing the VOC-reduced gas stream from the thermal oxidizer to said heat exchanger for flow through said second gas flow path thereof; and means for discharging a cooled VOC-reduced gas stream from the second gas flow path of the heat exchanger;

wherein the heat exchanger and thermal oxidizer are sized, constructed and arranged to effect thermal oxidation of VOC and to recover at least 50% of heat in the VOC-reduced gas stream passed from the thermal oxidizer to the heat exchanger;

means for controlling flow of said VOC-containing gas stream from said upstream semiconductor manufacturing process unit to said means for introducing the VOC-containing gas stream to the heat exchanger, to maintain a selected pressure at the upstream semiconductor manufacturing process unit;

a multiplicity of heat transfer inserts, each of which is selectively positionable in the first gas flow path to vary the heat transfer in the heat exchanger and selectively removable therefrom, and wherein the first gas flow path contains at least one of said heat transfer inserts;

said heat exchanger having a heat transfer area, with said heat transfer area in the range of from 25 to 500 feet$^2$; and a vertically upstanding cabinet containing said heat exchanger and thermal oxidizer, with the cabinet having a footprint area not exceeding 25 feet$^2$, and the cabinet having a volume not exceeding 250 feet$^3$, whereby the cabinet is positionable in close physical proximity to said upstream semiconductor manufacturing process unit producing a VOC-containing gas stream, in a semiconductor manufacturing process facility.

23. A point-of-use catalytic oxidation apparatus according to claim 22, further comprising means for effecting removal of hexamethyldisilazane from the VOC-containing gas stream prior to flow of the VOC-containing gas stream into the heat exchanger.

24. A point-of-use catalytic oxidation apparatus according to claim 23, wherein the hexamethyldisilazane removal means comprises a water scrubber or a burner, for removal of the hexamethyldisilazane from the gas flow stream.

25. A semiconductor manufacturing process system, comprising:

(a) a semiconductor manufacturing process unit; and (b) a compact, point-of-use catalytic oxidation apparatus arranged for connection to the semiconductor manufacturing process unit producing a VOC-containing gas stream, to receive said VOC-containing gas stream, and for treatment of said VOC-containing gas stream, said catalytic oxidation apparatus comprising:

a heat exchanger defining a first gas flow path for said VOC-containing gas stream and a second gas flow path for a VOC-reduced gas stream at higher temperature than said VOC-containing gas stream, wherein the first gas flow path and the second gas flow path are in heat exchange relationship with one another, to effect heat recovery from said VOC-reduced gas stream for cooling thereof, and to preheat the VOC-containing gas stream;

means for introducing the VOC-containing gas stream to the heat exchanger;

a supplemental heater for supplemental heating of preheated VOC-containing gas to an elevated temperature for catalytic oxidation of VOC therein;

means for passing the preheated VOC-containing gas stream from the heat exchanger to the supplemental heater;

a bed of catalytic oxidizer material for catalytic oxidation of VOC in the VOC-containing gas stream to yield the VOC-reduced gas stream;

means for passing the VOC-containing gas stream from the supplemental heater to the bed of catalytic oxidizer material for catalytic oxidation of VOC therein to yield the VOC-reduced gas stream;

means for passing the VOC-reduced gas stream from the bed of catalytic oxidizer material to said heat exchanger for flow through said second gas flow path thereof; and means for discharging a cooled VOC-reduced gas stream from the second gas flow path of the heat exchanger;

wherein the heat exchanger, supplemental heater, and bed of catalytic oxidizer material are sized, constructed and arranged to effect autothermal catalytic oxidation of VOC in said bed of catalytic oxidizer material;

means for controlling flow of said VOC-containing gas stream from said upstream semiconductor manufacturing process unit to said means for introducing the VOC-containing gas stream to the heat exchanger, to maintain a selected pressure at the upstream semiconductor manufacturing process unit;

said heat exchanger having a heat transfer area, with said heat transfer area in the range of from 25 to 500 feet$^2$; and a vertically upstanding cabinet containing said heat exchanger, supplemental heater, and bed of catalytic oxidizer material, with the cabinet having a footprint area not exceeding 25 feet$^2$, and the cabinet having a volume not exceeding 250 feet$^3$, whereby the cabinet is positionable in close physical proximity to said semiconductor manufacturing process unit producing a VOC-containing gas stream, in a semiconductor manufacturing process facility.

26. A semiconductor manufacturing process system according to claim 25, wherein the semiconductor manufacturing process unit producing a VOC-containing gas stream is selected from the group consisting of isopropanol dryers, photolithography tracks, spin-on-glass coaters, organic spray strip resist tools, organic strip wet benches, and parts cleaning benches.

27. A catalytic oxidation apparatus according to claim 25, wherein the means for controlling flow of said VOC-containing gas stream is contained in the cabinet.

28. A catalytic oxidation apparatus according to claim 25, wherein the means for controlling flow of said VOC-containing gas stream comprise a variable speed blower.

29. A catalytic oxidation apparatus according to claim 25, further comprising a multiplicity of heat transfer inserts, each of which is selectively positionable in the first gas flow path to vary the heat transfer in the heat exchanger and selectively removable therefrom, and wherein the first gas flow path contains at least one of said heat transfer inserts.

* * * * *

UNITED STATES PATENT AND TRADEMARK OFFICE
CERTIFICATE OF CORRECTION

PATENT NO : 5,914,091

DATED : June 22, 1999

INVENTOR(S) : Mark R. Holst, Karl Olander, and Glenn M. Tom

It is certified that error appears in the above-identified patent and that said Letters Patent are hereby corrected as shown below:

| | |
|---|---|
| Column 2, line 46: | change "catalyst" to --of the catalytic--. |
| Column 3, line 39: | change "hexamethyidisilazane" to --hexamethyldisilazane--. |
| Column 19, line 31: | change "For" to --for--. |

Signed and Sealed this

Tenth Day of April, 2001

NICHOLAS P. GODICI

*Attest:*

*Attesting Officer*  *Acting Director of the United States Patent and Trademark Office*